US009395529B2

(12) United States Patent
Kusaka

(10) Patent No.: US 9,395,529 B2
(45) Date of Patent: Jul. 19, 2016

(54) MICROINSEMINATION METHOD USING MICROSCOPE

(71) Applicant: OLYMPUS CORPORATION, Shibuya-ku, Tokyo (JP)

(72) Inventor: Kenichi Kusaka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 167 days.

(21) Appl. No.: 14/063,634

(22) Filed: Oct. 25, 2013

(65) Prior Publication Data
US 2014/0049815 A1     Feb. 20, 2014

Related U.S. Application Data

(63) Continuation of application No. PCT/JP2012/061123, filed on Apr. 25, 2012.

(30) Foreign Application Priority Data

May 2, 2011   (JP) ................................ 2011-102742

(51) Int. Cl.
*G02B 21/06*    (2006.01)
*G02B 21/00*    (2006.01)
*G02B 21/14*    (2006.01)

(52) U.S. Cl.
CPC ............ *G02B 21/06* (2013.01); *G02B 21/0056* (2013.01); *G02B 21/0068* (2013.01); *G02B 21/0092* (2013.01); *G02B 21/14* (2013.01)

(58) Field of Classification Search
CPC ............... G02B 21/14; G02B 21/0068; G02B 21/0092; G02B 21/0056; G02B 21/00; G02B 21/0004; G02B 21/0008; G02B 21/0012; G02B 21/0016; G02B 21/002; A61B 19/5223

USPC .......................................... 359/370, 371, 386
See application file for complete search history.

(56) References Cited

U.S. PATENT DOCUMENTS 3,905,315 A      9/1975   Sasaki
8,599,479 B2 *   12/2013  Matsui ......................... 359/370
(Continued)

FOREIGN PATENT DOCUMENTS

GB    1 509 276 A    5/1978
JP    51-29149 A     3/1976
(Continued)

OTHER PUBLICATIONS

International Search Report (ISR) dated Jun. 12, 2012 (and English translation thereof) in International Application No. PCT/JP2012/061123.
(Continued)

*Primary Examiner* — Thomas K Pham
*Assistant Examiner* — Alberto Betancourt
(74) *Attorney, Agent, or Firm* — Holtz, Holtz & Volek PC

(57) ABSTRACT

A microscope includes a light source; a condenser lens irradiating a sample with a light from the light source; an objective facing the condenser lens across the sample; a first polarization plate placed between the light source and the condenser lens; a condenser turret placed between the first polarization plate and the condenser lens and having a plurality of optical elements placed inside; a polarization plate placed on the image side with respect to the objective; and a compensator placed between the first polarization plate and the polarization plate. In the microscope, according to the observation method, an optical element to be placed in an optical path among the plurality of optical elements placed inside the condenser turret is switched by rotation of the condenser turret.

3 Claims, 15 Drawing Sheets

(56) References Cited

U.S. PATENT DOCUMENTS

| | | |
|---|---|---|
| 2003/0030902 A1 | 2/2003 | Fukushima et al. |
| 2009/0174938 A1* | 7/2009 | Tsuchiya .................. 359/388 |
| 2009/0195867 A1 | 8/2009 | Euteneuer et al. |
| 2010/0284065 A1 | 11/2010 | Matsui et al. |
| 2012/0092761 A1 | 4/2012 | Matsui et al. |
| 2012/0224257 A1 | 9/2012 | Tsuchiya |

FOREIGN PATENT DOCUMENTS

| | | |
|---|---|---|
| JP | 51-128548 A | 11/1976 |
| JP | 57-178211 A | 11/1982 |
| JP | 57-178212 A | 11/1982 |
| JP | 08-190054 A | 7/1996 |
| JP | 09-281400 A | 10/1997 |
| JP | 11-258511 A | 9/1999 |
| JP | 2003-050353 A | 2/2003 |
| JP | 2003-121749 A | 4/2003 |
| JP | 2009115902 A | 5/2009 |
| JP | 2009-163069 A | 7/2009 |
| JP | 2011-17964 A | 1/2011 |
| WO | WO 2009/093530 A1 | 7/2009 |

OTHER PUBLICATIONS

Japanese Office Action (and English translation thereof) dated Feb. 23, 2016, issued in counterpart Japanese Application No. 2013-513078.

* cited by examiner

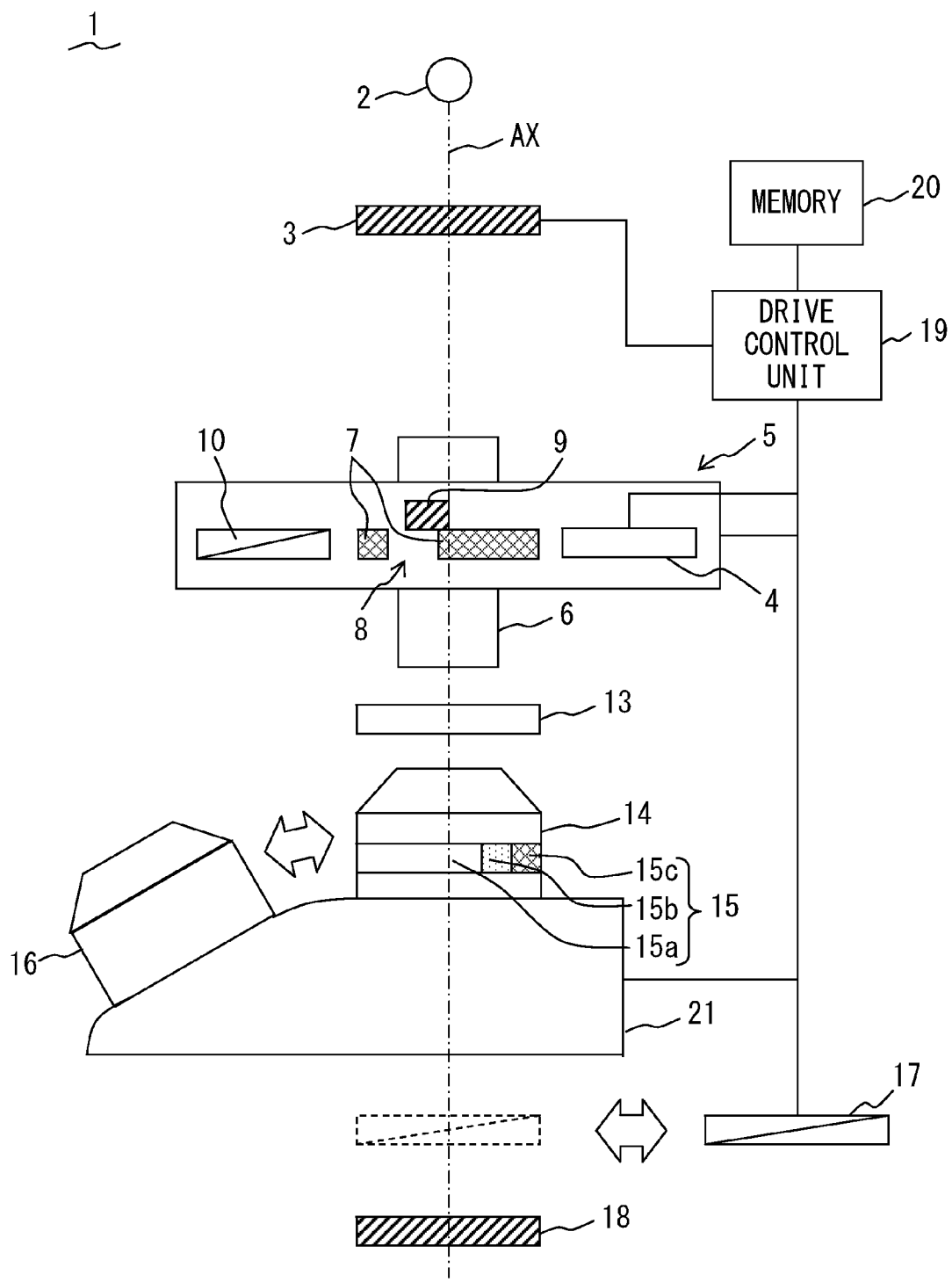
F I G. 1

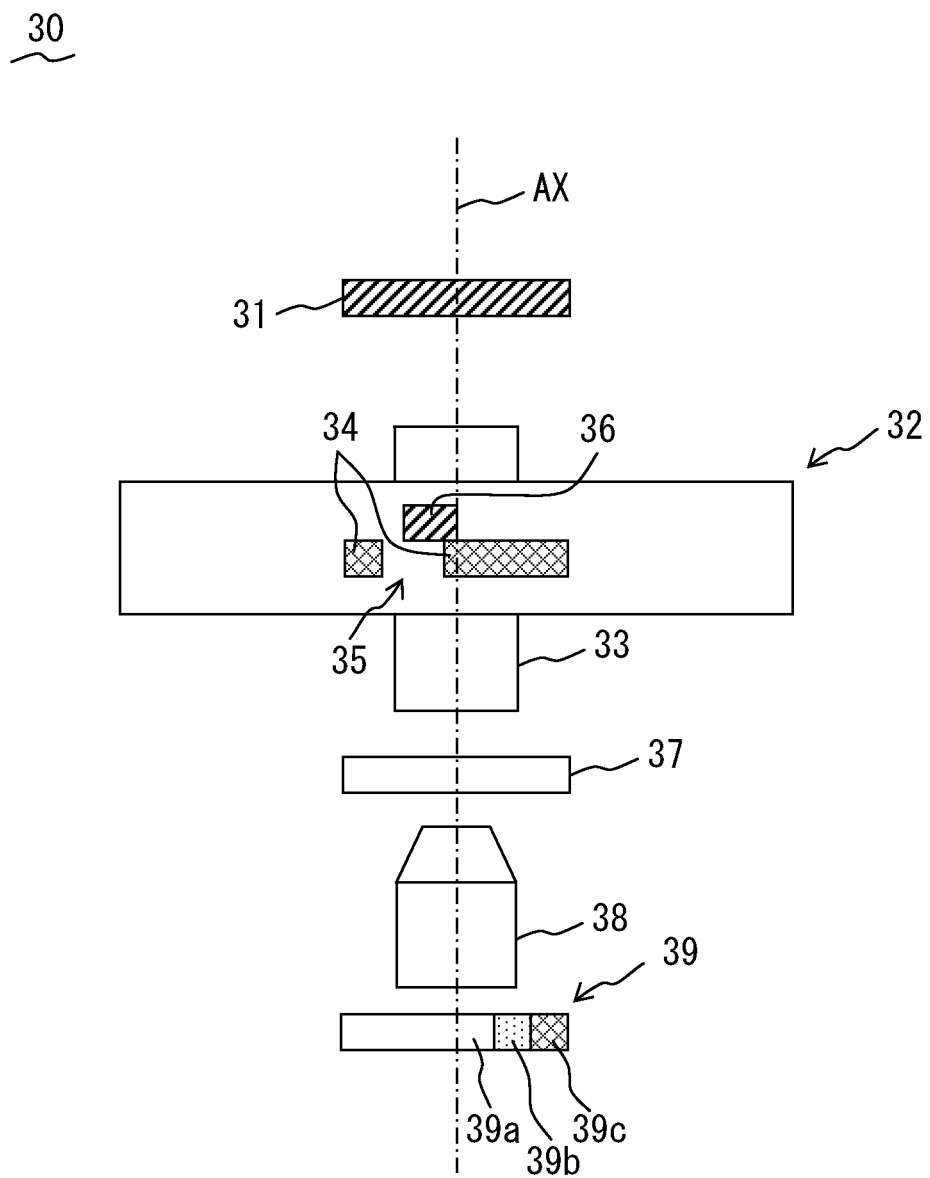
< PRIOR ART >
F I G. 2

< PRIOR ART >

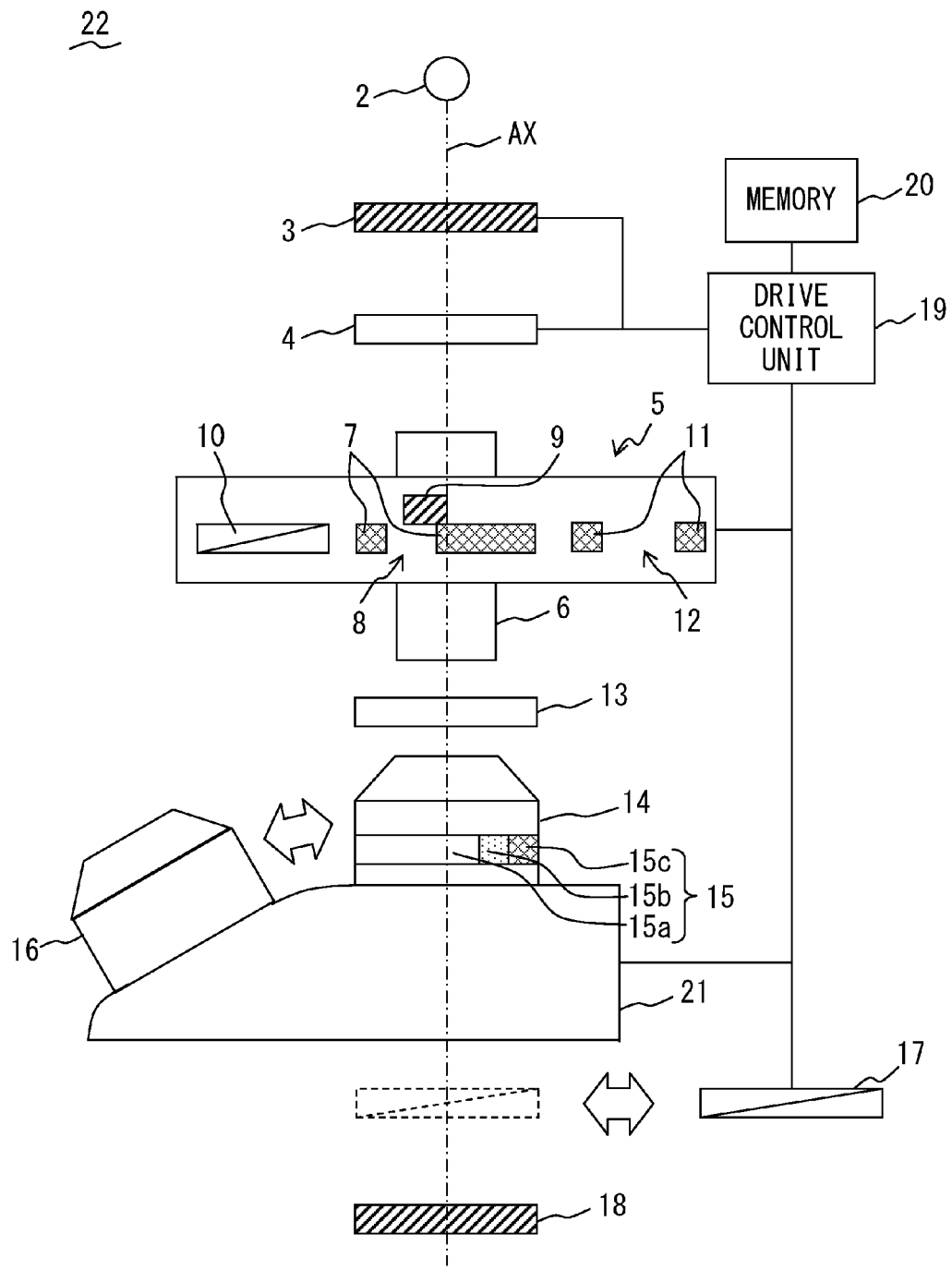
F I G. 5

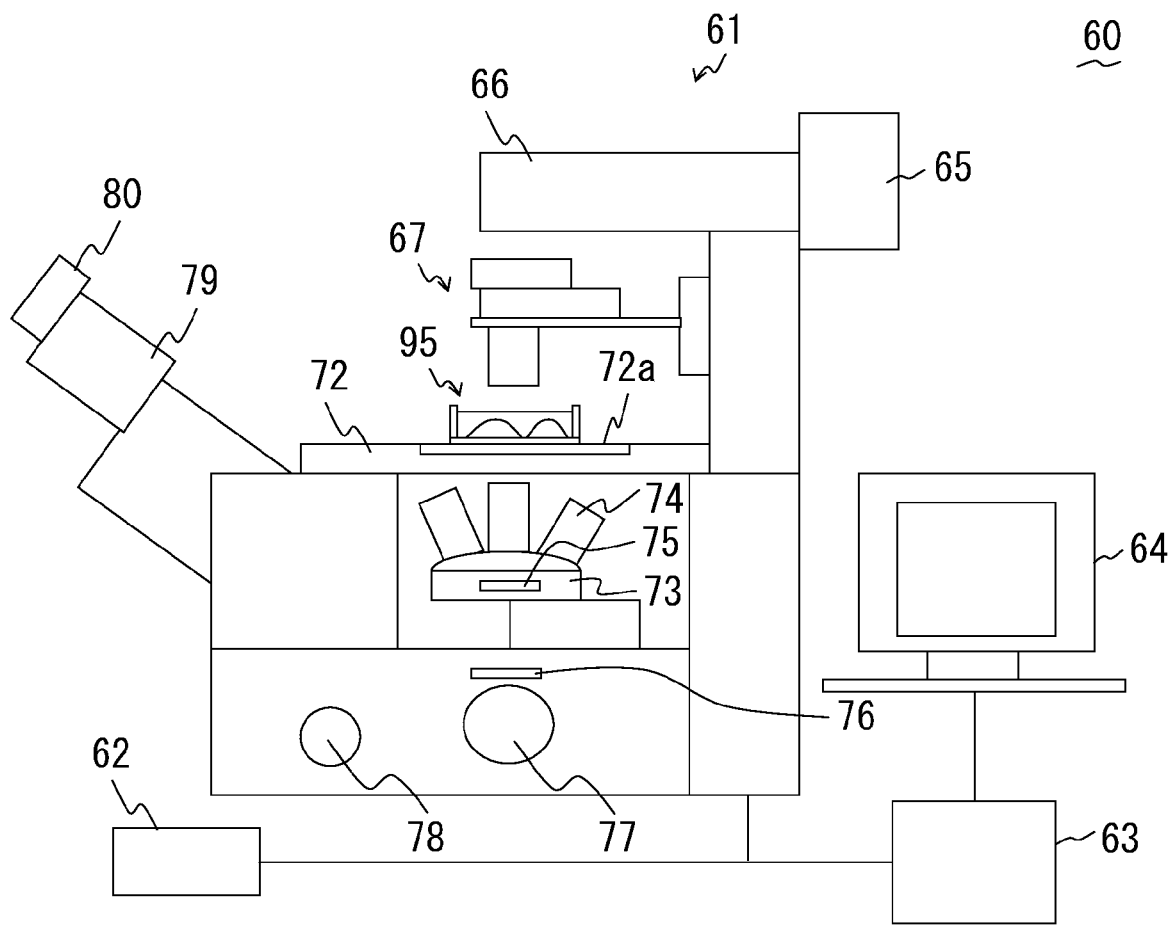
F I G. 7

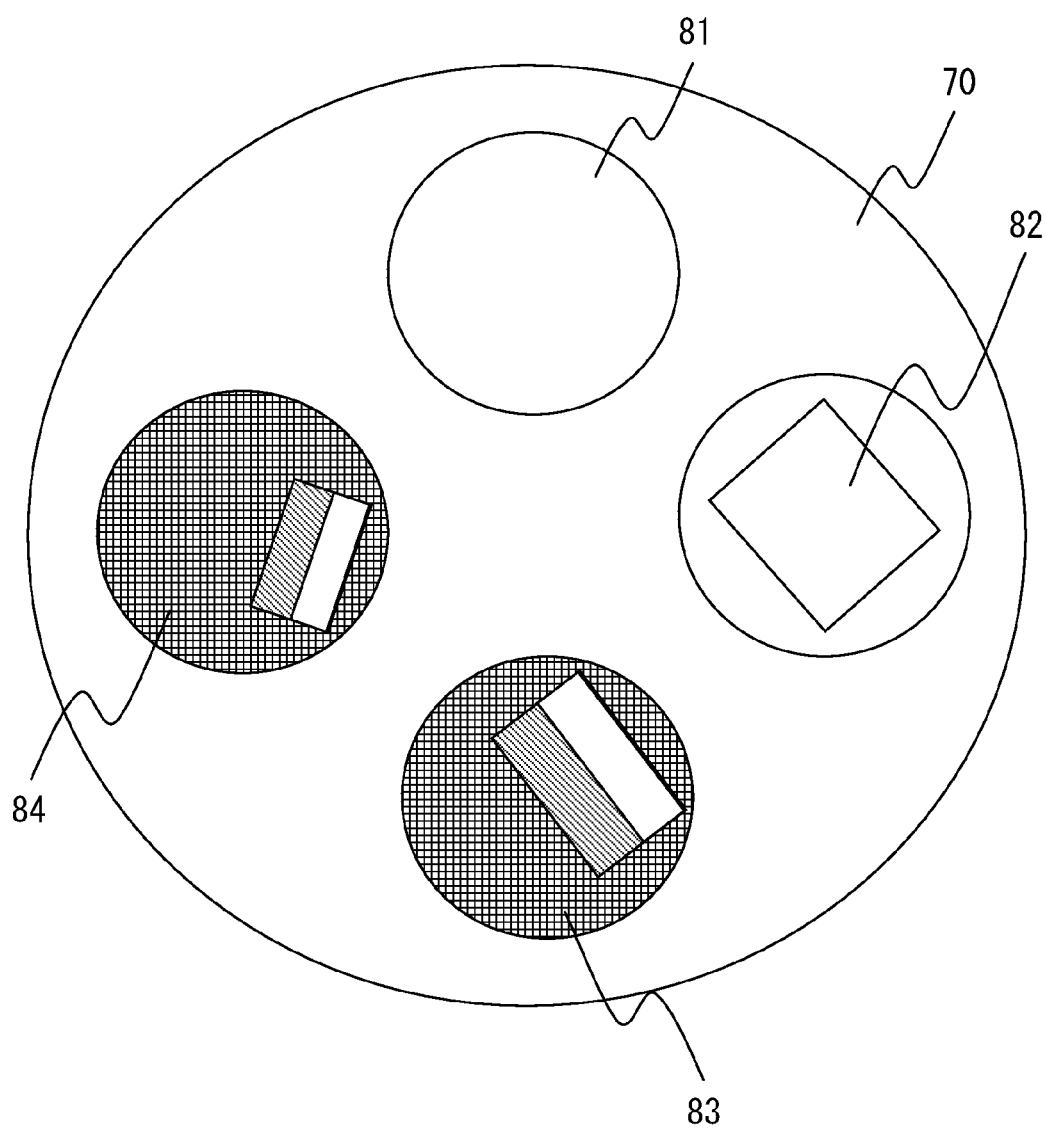
F I G. 9

| | BRIGHT FIELD | 20XRC | 40XRC | 20X POLARIZATION | 60XDIC |
|---|---|---|---|---|---|
| POLARIZER | PARALLEL-NICOL WITH ANALYSER | ROTATE IN GIVEN ANGLE | ROTATE IN GIVEN ANGLE | CROSSED-NICOL WITH ANALYSER | CROSSED-NICOL WITH ANALYSER |
| COMPENSATOR | IN OPTICAL PATH | IN OPTICAL PATH | IN OPTICAL PATH | ROTATE IN GIVEN ANGLE IN OPTICAL PATH | IN OPTICAL PATH |
| CONDENSER TURRET | APERTURE | 20X APERTURE FOR RC | 40X APERTURE FOR RC | APERTURE | 60X DIC PRISM |
| OBJECTIVE LENS | 4X | 20X FOR RC | 40X FOR RC | 20X FOR RC | 60X |
| DIC PRISM (OBJECTIVE LENS SIDE) | OUTSIDE OPTICAL PATH | OUTSIDE OPTICAL PATH | OUTSIDE OPTICAL PATH | OUTSIDE OPTICAL PATH | IN OPTICAL PATH |
| ANALYSER | IN OPTICAL PATH | IN OPTICAL PATH | IN OPTICAL PATH | IN OPTICAL PATH | IN OPTICAL PATH |

F I G. 1 1

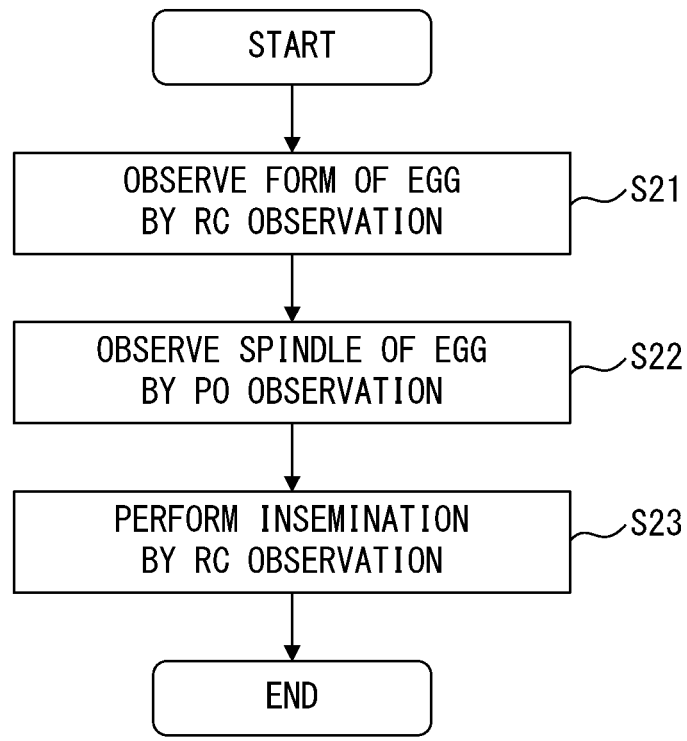
F I G. 13

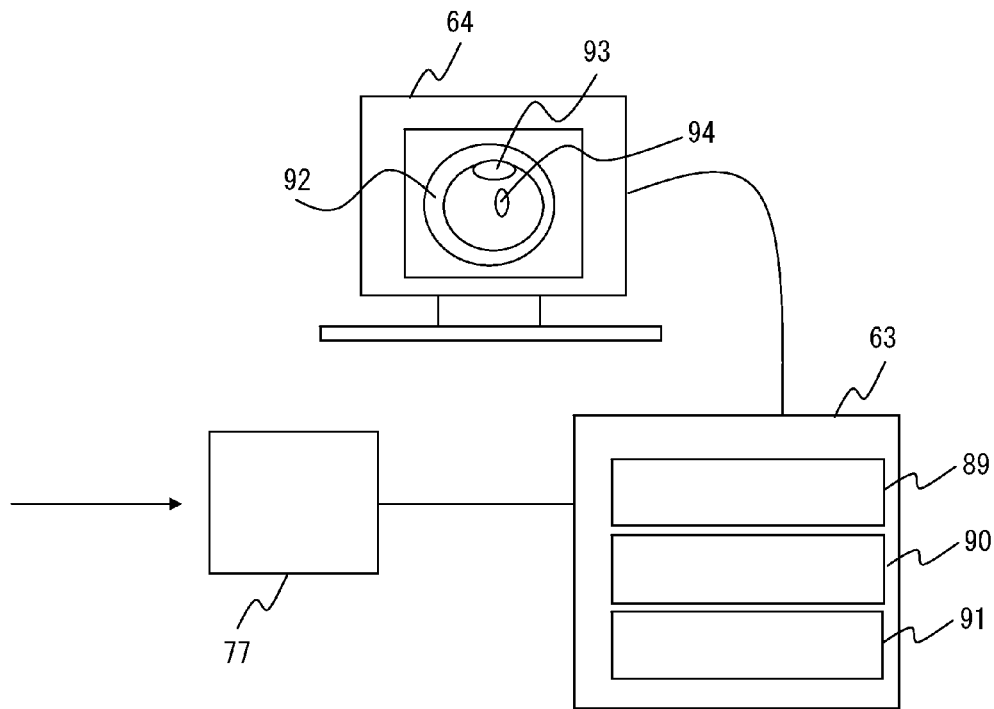
F I G. 1 4

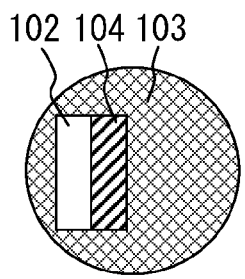
FIG. 15B
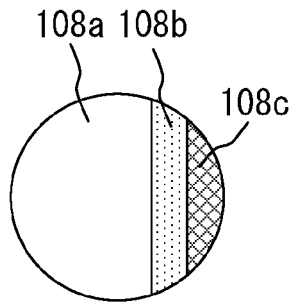
FIG. 15C
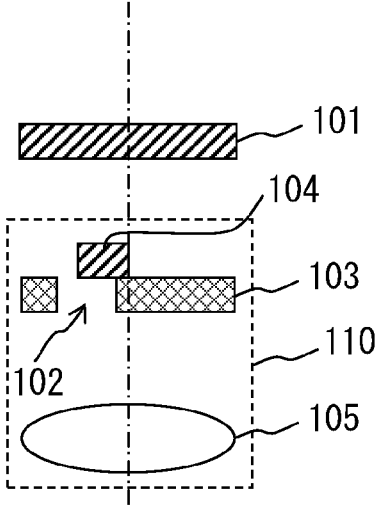
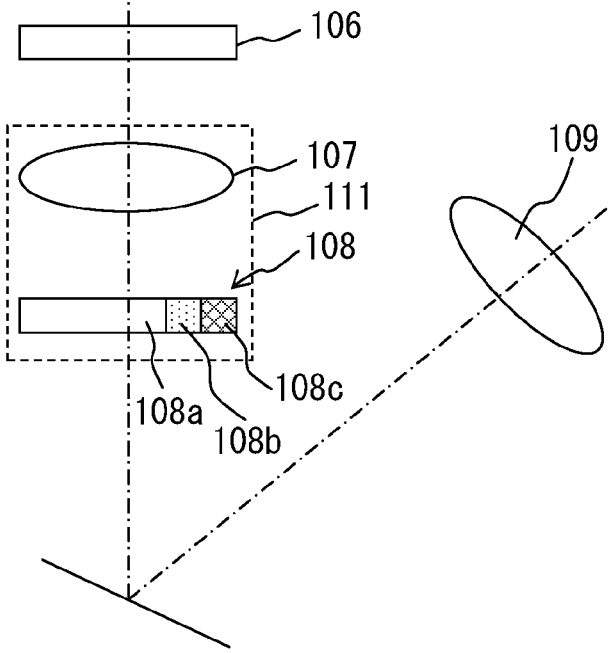
FIG. 15A
< PRIOR ART >

MICROINSEMINATION METHOD USING MICROSCOPE

CROSS-REFERENCE TO RELATED APPLICATION

This application is based upon and claims the benefit of priority from prior Japanese Patent Application No. 2011-102742, filed May 2, 2011, the entire contents of which are incorporated herein by this reference.

This is a Continuation application of PCT Application No. PCT/JP2012/061123, filed Apr. 25, 2012, which was not published under PCT Article 21(2) in English.

BACKGROUND OF THE INVENTION

1. Field of the Invention

The present invention relates to a technique for a microscope, especially a microscope that is preferable for microinsemination, and a microinsemination method using it

2. Description of the Related Art

As one of applications of microscopes, microinsemination in the field of advanced reproductive medicine has been known. The microinsemination is a method of joining sperm and egg under a microscope and fertilizing the egg, which is generally practiced with the Intracytoplasmic sperm injection (ICSI) where a micropipette in which sperm is stored is stabbed into an egg locked by the holding pipette and the sperm is injected directly into the egg. In this method, since the sample is handled on the stage, it is a general practice to use an inverted microscope that has a large operation space above the stage.

Conventionally, in the field of microinsemination, the modulation contrast observation (also called relief contrast observation; hereinafter, referred to as RC observation) has been used. A microscope used for the RC observation is disclosed, for example, in Japanese Laid-open Patent Publication No. 51-29149.

FIG. 15A through FIG. 15C are diagrams for explaining the configuration of the microscope according to the conventional art used for the RC observation. FIG. 15A presents the overall configuration of the microscope used for the RC observation. FIG. 15B is a diagram of a view of the apertured plate included in the condenser lens of the microscope from the optical axis direction. FIG. 15C is a diagram of a view of the modulator included in the objective of the microscope from the optical axis direction.

A microscope 100 illustrated in FIG. 15A includes a polarization plate 101 that rotates around the optical axis, a condenser lens 110, an objective 111 that faces the condenser lens 110 across the sample 106, and an eyepiece 109. The condenser lens 110 includes an apertured plate 103 on which an aperture 102 is formed at a position off the optical axis, a polarization plate 104 that covers a part of the aperture 102, and a lens 105. The objective 111 includes a lens 107, and a modulator 108 that has three areas with a different transmittance (an area 108a having a 100% transmittance, an area 108b having a transmittance of about 25%, and an area 108c having a 0% transmittance). The modulator 108 is positioned on the pupil position of the objective 111, and the modulator 108 and the apertured plate 103 are in an optically-conjugate relationship with each other. Meanwhile, the modulator 108 is only required to be on a position that is optically conjugate with the pupil position of the objective 111. While the modulator 108 is located inside the objective 111 in FIG. 15A, it may also be located on a position that is optically conjugate with the pupil position of the objective 111 outside the objective 111.

According to the RC observation, the egg may be observed three dimensionally by the effect of the oblique illumination due to the aperture 102 and the modulation effect of the modulator 108 on the light through the aperture 102. Therefore, the RC observation is preferable for the ICSI and has been widely used conventionally in the field of microinsemination.

In recent years, in the field of microinsemination, a method of microinsemination in which the microscope is used while switching between a plurality of observation methods as needed to improve the fertility rate has attracted attention. Specifically, a method to use the RC observation mentioned above along with other observation methods such as the differential interference contrast observation (hereinafter, referred to as DIC observation) and polarization observation (hereinafter, referred to as PO observation) is becoming popular.

Since the object may be observed at a high magnification in the DIC observation compared with the RC observation in which a high numerical aperture for illumination may not be obtained, the DIC observation is preferable for observing the sperm that is smaller compared with the egg. For this reason, it is used when selecting a good sperm based on the shape. In addition, the PO observation is preferable for observing the spindle of the egg that has a birefringent property. For this reason, it is used when checking the location of the spindle in order to avoid accidentally damaging the spindle when injecting the sperm into the egg.

SUMMARY OF THE INVENTION

An embodiment of the present invention provides a microscope including a light source; a condenser lens irradiating a sample with a light from the light source; an objective facing the condenser lens across the sample; a first polarization plate placed between the light source and the condenser lens; a condenser turret placed between the first polarization plate and the condenser lens and having a plurality of optical elements placed inside; a second polarization plate placed on an image side with respect to the objective; and a compensator placed between the first polarization plate and the second polarization plate, where according to an observation method, an optical element to be placed in an optical path among the plurality of optical elements placed inside the condenser turret is switched by rotation of the condenser turret.

Another embodiment of the present invention provides a microinsemination method using the microscope according to the embodiment described above, including adjusting a rotation angle of the first polarization plate and observing a form of an egg by modulation contrast observation in which a contrast is adjusted; setting the first polarization plate and the second polarization plate in a crossed-Nicol condition and observing a spindle of the egg by polarization observation; and adjusting the rotation angle of the first polarization plate and performing microinsemination by modulation contrast observation in which a contrast is adjusted.

Yet another embodiment of the present invention provides a microscope performing modulation contrast observation, differential interference contrast observation and polarization observation selectively, comprising: a light source; a condenser lens irradiating a sample with a light from the light source; an objective facing the condenser lens across the sample; a first polarization plate placed between the light source and the condenser lens; a condenser turret placed between the first polarization plate and the condenser lens; a compensator placed between the first polarization plate and the condenser turret, where the condenser turret includes a DIC prism and an optical element for modulation contrast; and according to an observation method, an optical element placed in an optical path inside the condenser turret is switched by rotation of the condenser turret; and a contrast of an image of the sample is adjusted by changing retardation of the compensator.

BRIEF DESCRIPTION OF THE DRAWINGS

The present invention will be more apparent from the following detailed description when the accompanying drawings are referenced.

FIG. 1 is a diagram for explaining the configuration of a microscope according to embodiment 1.

FIG. 2 is a diagram for explaining the adjusting method of the contrast in a microscope according to a conventional art used for the RC observation.

FIG. 5 is a diagram for explaining the configuration of a microscope according to embodiment 2.

FIG. 7 is a diagram for explaining the configuration of a microscope according to embodiment 4.

FIG. 9 is a diagram for explaining the configuration of the condenser turret of the microscope according to embodiment 4.

FIG. 11 is a setting table of the microscope according to embodiment 4.

FIG. 13 is a flowchart illustrating a procedure of microinsemination by the microscope according to embodiment 4.

FIG. 14 is a diagram for explaining image processing by the microscope according to embodiment 4.

FIG. 15A illustrates the overall configuration of a microscope according to the conventional art used for the RC observation.

FIG. 15B is a diagram of an apertured plate included in a condenser lens of the microscope illustrated in FIG. 15A viewed from the direction of the optical axis.

FIG. 15C is a diagram of a modulator included in an objective of the microscope illustrated in FIG. 15A viewed from the direction of the optical axis.

DESCRIPTION OF THE PREFERRED EMBODIMENTS

Incidentally, an egg obtained for microinsemination is usually stored under a temperature environment that is optimal for the egg by an incubator and the like. However, when the operation to inject the sperm is performed, the egg is taken out of the incubator and placed on the microscope. The environment on the microscope may not necessarily be the optimal environment for the egg, and in order to suppress the stress put on the egg, it is desirable to finish the operation performed on the microscope in a short period of time. Therefore, there is a need a configuration of the microscope that enables switching of a plurality of observation methods used in microinsemination with just a small number of works and in a short time.

Embodiment 1

Figure 3:
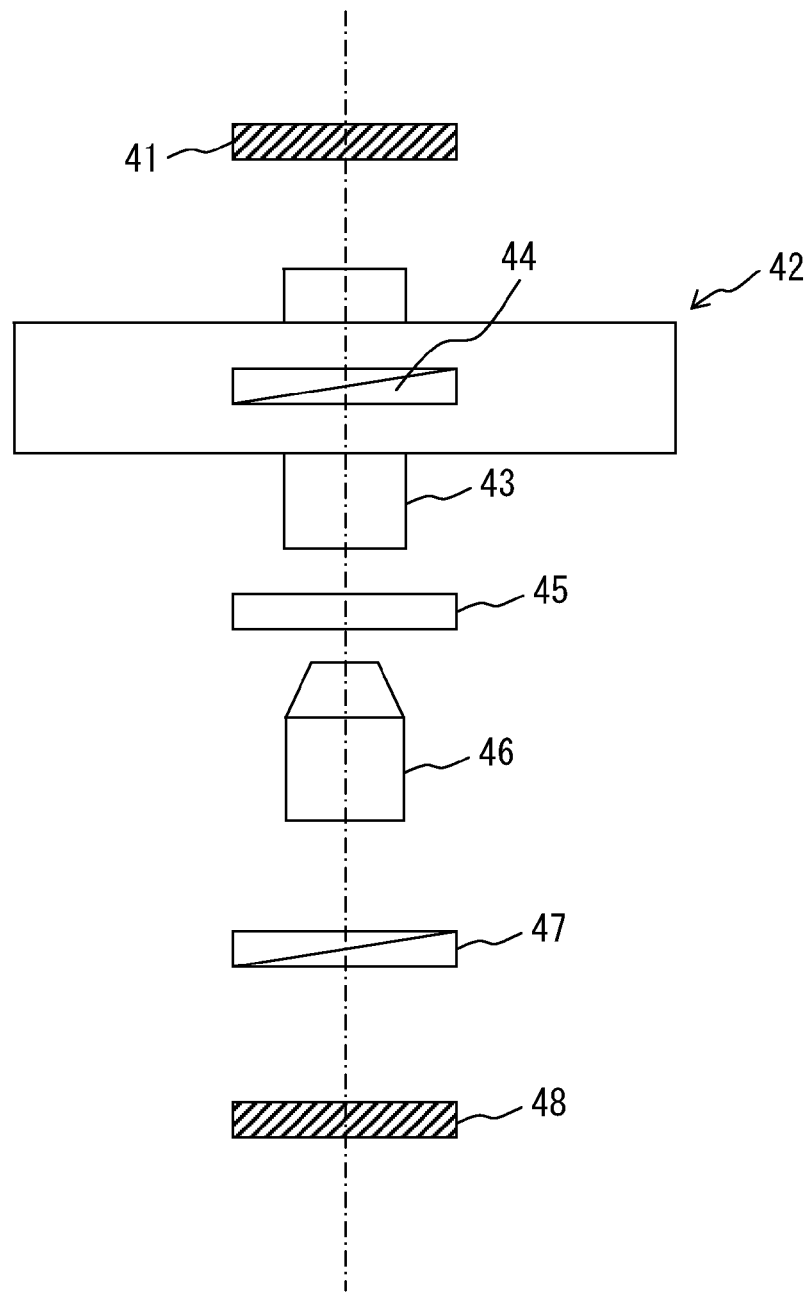
FIG. 3 is a diagram for explaining the adjusting method of the contrast in a microscope according to a conventional art used for the DIC observation.
Figure 4:
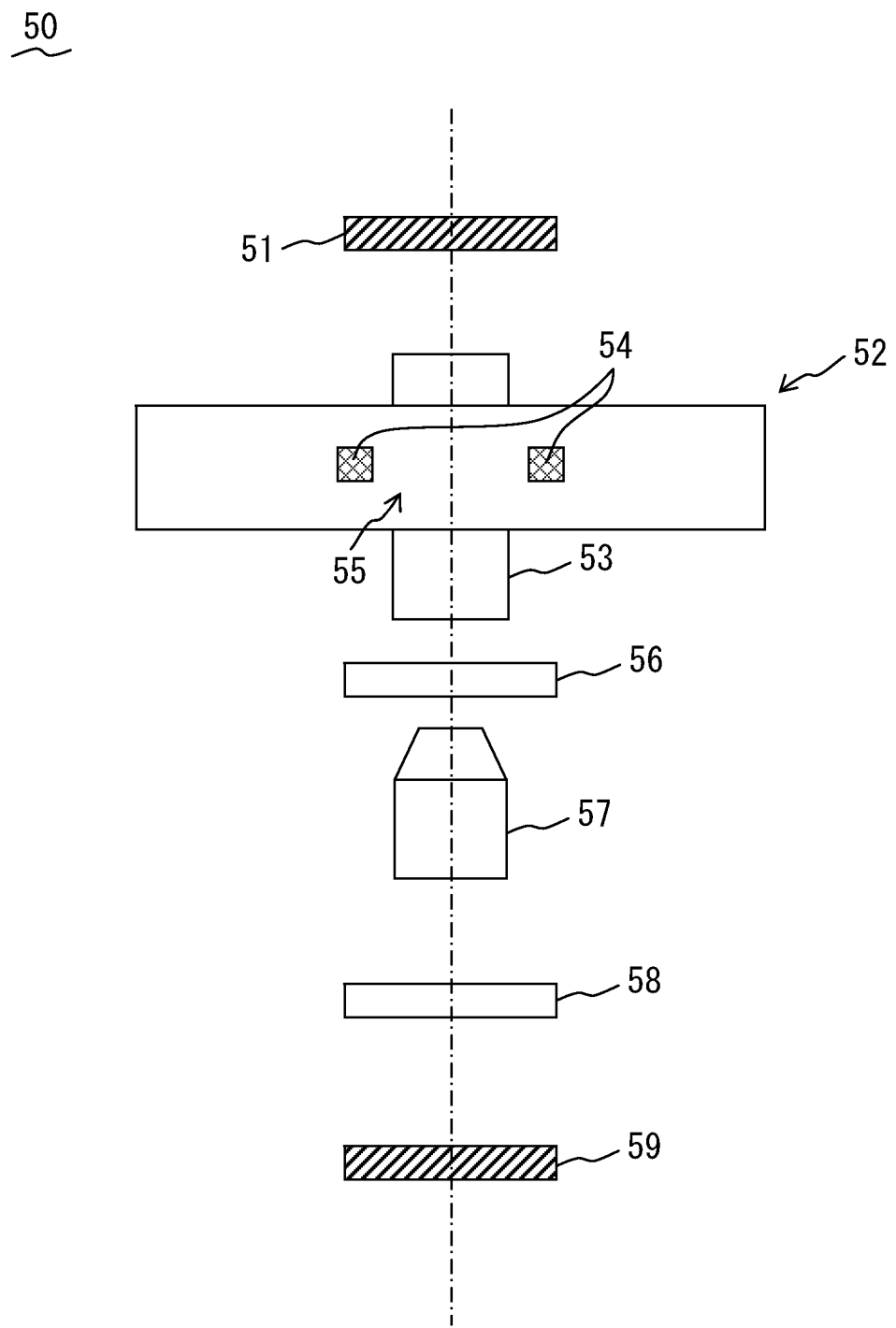
FIG. 4 is a diagram for explaining the adjusting method of the contrast in a microscope according to a conventional art used for the PO observation.

FIG. 1 is a diagram for explaining the configuration of a microscope according to the present embodiment. FIG. 2, FIG. 3, and FIG. 4 are diagrams for explaining the adjusting method of the contrast in a microscope according to the conventional art used for the RC observation, DIC observation and PO observation, respectively.

First, before explaining the microscope according to the present embodiment, the configuration and the contrast adjusting method for a microscope according to the conventional art used for each of the RC observation, DIC observation and PO observation is explained with reference to FIG. 2 through FIG. 4.

As illustrated in FIG. 2, a microscope 30 according to the conventional art used for the RC observation includes a polarization plate 31 placed rotatably, a condenser turret 32, and a condenser lens 33, in this order from the light source side on the illumination optical path. In addition, the microscope 30 includes an objective 38, and a modulator 39 including three areas with a difference transmittance (an area 39a having a 100% transmittance, an area 39b having a transmittance of about 25%, and an area 39c having a 0% transmittance), in this order from the sample 37 side on the observation optical path. In the condenser turret 32, an apertured plate 34 on which an aperture 35 is formed on a position off the optical axis AX, and a polarizer 36 covering a part of the aperture 35 are placed in the illumination optical path. In addition, the modulator 39 is located on the pupil position of the objective 38, and is in an optically conjugate relationship with the apertured plate 34 placed on the pupil position of the condenser lens 33.

In the microscope 30, while the polarizer 36 in the turret is fixed, the polarizer 31 is placed rotatably. Therefore, by rotating the polarizer 31, the direction of polarization of the illumination light (linear polarization) through the polarizer 31 may be changed. As the direction of polarization of the illumination light through the polarizer 31 changes, the amount of light of the illumination light through the polarizer 36 also changes, and as a result, the contrast of the image of the sample 37 is adjusted. That is, in the microscope 30 according to the conventional art used for the RC observation, the operation unit for the contrast adjustment is the operation unit of the polarizer 31, and the contrast is adjusted by the rotation of the polarizer 31.

As illustrated in FIG. 3, a microscope 40 according to the conventional art used for the DIC observation includes a polarization plate 41 that functions as a polarizer, a condenser turret 42 that includes a DIC prism 44 inside, and a condenser lens 43, in this order from the light source side on the illumination optical path. In addition, the microscope 40 includes an objective 46, a DIC prism 47, and a polarization plate 48 that functions as an analyzer, in this order from the sample 45 side on the observation optical path. The polarization plate 41 and the polarization plate 48 are placed so that their polarization directions are orthogonal to each other, that is, so as to be in a crossed-Nicol arrangement. As the DIC prism, for example, the Nomarski prism is available.

The microscope 40 visualizes, by the action of interference, the phase difference generated by two polarized lights that are orthogonal to each other separated by the DIC prism 44 and synthesized by the DIC prism 47 passing through slightly different positions of the sample 45. In the microscope 40, the difference in the optical path lengths between the DIC prisms may be changed by moving the DIC prism 47 within the plane that is orthogonal to the optical axis. When the difference in the optical path lengths between the two polarized lights is changed by moving the DIC prism 47, the phase difference between the two polarized lights also changes, and as a result, the contrast of the image of the sample 45 is adjusted. That is, in the microscope 40 according to the conventional art used for the DIC observation, the operation unit for the contrast adjustment is the operation unit of the DIC prism 47, and the contrast is adjusted by the movement of the DIC prism 47.

Meanwhile, in the DIC observation, a method to change the contrast by changing the retardation using a Senarmont compensator being a combination of a rotating polarization plate and a quarter wavelength plate that is not illustrated in the drawing has also been known.

As illustrated in FIG. 4, a microscope 50 according to the conventional art used for the PO observation includes a polarization plate 51 that functions as a polarizer, a condenser turret 52, and a condenser lens 53, in this order from the light source side on the illumination optical path. In addition, the microscope 50 includes an objective 57, a compensator 58, and a polarization plate 59 that functions as an analyzer, in this order from the sample 56 on the observation optical path. Inside the condenser turret 52, an apertured plate 54 on which an aperture 55 is formed is placed. In addition, the polarization plate 51 and the polarization plate 59 are placed so that their polarization directions are orthogonal to each other, that is, so as to be in a crossed-Nicol arrangement.

The microscope 50 visualizes, by the action of interference, the phase difference between orthogonal two polarized lights generated by the birefringent property of the sample 56. In the microscope 50, the phase difference between the two polarized lights is changed by changing the retardation of the compensator 58, and as a result, the contrast of the image of the sample 56 is adjusted. That is, in the microscope 50 according to the conventional art used for the PO observation, the operation unit for the contrast adjustment is the operation unit of the compensator 58, and the contrast is adjusted by the change of the retardation of the compensator 58.

While FIG. 4 presents an example in which the apertured plate 54 is placed within the condenser turret 52, as long as the aperture 55 is formed within the condenser turret 52, the aperture plate 54 does not necessarily need to be present.

As illustrated in FIG. 2 through FIG. 4, the configurations of the microscopes according to the conventional art used for each of the RC observation, DIC observation and PO observation are different from each other. The difference between the configuration of the microscope used for the RC observation and the configurations of the microscopes used for the other observation methods (DIC observation, PO observation) are especially large. For this reason, when switching the observation methods, installment and removal (insertion to, and removal from, the optical path) of many optical elements is required, making it difficult to switch the observation methods in a short period of time.

Next, the configuration and the contrast adjusting method of a microscope according to the present embodiment are explained.

The microscope according to the present embodiment is an inverted microscope that is capable of performing the RC observation, DIC observation, PO observation selectively while switching between them as needed, which is a microscope preferable for microinsemination.

As illustrated in FIG. 1, a microscope 1 includes, on the illumination optical path, a light source 2, a polarization plate 3 (a first polarization plate) that functions as a polarizer, a condenser turret 5 with a plurality of optical elements placed inside, and a condenser lens 6 that irradiates the sample 13 with the light from the light source 2, in this order from the light source side. In addition, the microscope 1 includes, on the observation optical path, an objective 14 that faces the condenser lens 6 across the sample 13, a revolving nosepiece 21 on which the objective 14 is installed, a DIC prism 17 (a second DIC prism) placed detachably with respect to the observation optical path, and a polarization plate 18 (a second polarization plate) that functions as an analyzer, in this order from the sample side.

Furthermore, the microscope 1 includes a drive control unit 19 that controls the driving of electrically-driven parts of the microscope 1, and a memory 20 being a storing unit to store the setting of the microscope 1 for each observation method. The drive control unit 19 is connected electrically to the memory 20, and is capable of reading out the setting information of the microscope stored in the memory 20.

Inside the condenser turret 5, an apertured plate 7 (a first apertured plate) having a polarization plate 9 in a part of an aperture 8 being an optical element for the RC observation, a DIC prism 10 (a first DIC prism) being an optical element for the DIC observation, and a compensator 4 being an optical element for the PO observation are included. The optical elements placed on the optical path inside the condenser turret 5 are switched by the rotation of the condenser turret 5 according to the observation method. Specifically, when performing the RC observation, the apertured plate 7 having the polarization plate 9 is placed on the optical path, when performing the DIC observation, the DIC prism 10 is placed on the optical path, and when performing the PO observation, the compensator 4 is placed on the optical path.

The apertured plate 7 is placed on the pupil position of the condenser lens 6 on the illumination optical path by the rotation of the condenser turret 5. The aperture 8 formed on the apertured plate 7 is formed on a position off the center of apertured plate 7 in order to realize the oblique illumination, and is placed on a position off the optical axis AX when the apertured plate 7 is placed on the illumination optical path.

The compensator 4 is an optical element to measure the phase difference due to the anisotropy of the sample, that is, the retardation, and has a structure to vary the retardation. There are various compensators such as those using a liquid crystal, a wavelength plate, and the like. Specifically, the Berek compensator, Senarmont compensator, Brace-Kohler compensator, quartz-wedge compensator, liquid crystal modulation element and the like are available. In the PO observation to observe the spindle of the egg, since it is desirable that the retardation in the field of view becomes approximately even, the liquid crystal modulation element, Senarmont compensator, Brace-Kohler compensator are desirable as the compensator 4.

Meanwhile, when using the crystal liquid modulation element as the compensator 4, the retardation of the compensator 4 may be changed by electrically controlling the liquid crystal molecules. Meanwhile, when using the Senarmont compensator as the compensator 4, the retardation of the compensator 4 may be changed by the rotation of the polarization plate 3 with respect to the wavelength plate in the compensator 4. In addition, when using a Brace-Kohler compensator as the compensator 4, the retardation of the compensator 4 may be changed by the rotation of the prism in the compensator 4.

In addition, while the compensator 4 is placed in the illumination optical path unlike the compensator 58 of the microscope 50 according to the conventional art illustrated in FIG. 4, it operates in a similar manner as the compensator 58 that is placed in the observation optical path.

On the revolving nosepiece 21, in addition to the objective 14, an objective 16 is installed. These objectives are used while being switched by the rotation of the revolving nosepiece 21 according to the observation method.

The objective 14 is an objective for the RC observation having a magnification (for example, 20×) suitable for observing the egg, and has a modulator 15 having three areas with a difference transmittance (an area 15a having a 100% transmittance, an area 15b having a transmittance of about 25%, and an area 15c having a 0% transmittance) on the pupil position of the objective 14. The modulator 15 is in an optically-conjugate relationship with the apertured plate 7 placed on the pupil position of the condenser lens 6. The objective 14 may also be used for the PO observation with the spindle of the egg being the main target of observation and requiring an approximately same level of magnification.

Meanwhile, the objective 16 is an objective that has a magnification (for example, a high magnification such as 60× or 100× and the like) that is suitable for observing the sperm, and is used for the DIC observation. The objective 16 differs from the objective 14 in that it has a different magnification and that it does not have the modulator 15.

The DIC prism 10 and the DIC prism 17 form a pair, and constitutes a differential interference contrast optical system. The DIC prism 10 is, for example, a Nomarski prism, which is placed detachably with respect to the illumination optical path with the rotation of the condenser turret 5. The DIC prism 17 is, for example, a Nomarski prism, which is placed detachably with respect to the observation optical path between the objective and the polarization plate 18.

The polarization plate 18 is placed on the image side of the objective 14 (revolving nosepiece 21), and is fixed in a predetermined direction with respect to the polarization plate 3 placed between the light source 2 and the condenser lens 6. Specifically, the polarization plate 3 and the polarization plate 18 are placed so that their polarization directions are orthogonal to each other, that is, so as to be in a crossed-Nicol arrangement.

While the polarization plate 18 is an indispensable constituent element in the DIC observation and the PO observation, the conventional RC observation usually does not involve polarization plate 18. However, as long as the oscillation direction of the polarization plate 9 in the turret is set to the 45-degree direction with respect to the analyzer (polarization plate 18) and the polarizer (polarization plate 3), the image only becomes dark even if the polarization plate 18 is there, and it does not disturb the observation. In the present embodiment, it is assumed that the analyzer (polarization plate 18) is always in the optical path, to omit the procedure of its insertion and removal.

The drive control unit 19 is, specifically, a control unit that makes the polarization plate 3, the condenser turret 5, and the revolving nosepiece 21 rotate in an electrically-driven manner, and a control unit that changes the retardation of the compensator 4 in an electrically-driven manner. In addition, the drive control unit 19 is also a control unit that inserts/removes the DIC prism 17 to/from the observation optical path in an electrically-driven manner. That is, the drive control unit 19 also functions as means to move the DIC prism 17 within the plane that is orthogonal to the optical axis. Meanwhile, the operation of the polarization plate 3, the compensator 4, the condenser turret 5, the revolving nosepiece 21, and the DIC prism 17 may be controlled by independent control units respectively instead of the drive control unit 19. In that case, it is desirable that each of the control units is respectively connected electrically to the memory 20.

In the microscope 1 according to the present embodiment, the RC observation and the PO observation and the DIC observation are switched arbitrarily by the switching operation of the optical element to be placed on the optical path with the rotation of the condenser turret 5, the switching operation of the objectives with the rotation of the revolving nosepiece 21 and the insertion/removal operation of the DIC prism 17.

Meanwhile, the switching operation of the objectives is an operation performed as needed according to the observation target, not only when switching the observation method. That is, in the microscope 1 according to the present embodiment, the RC observation and the PO observation and the DIC observation may be switched arbitrarily by performing only the two operations of the rotation of the condenser turret 5 and the insertion/removal of the DIC prism 17 in addition to the conventional operation.

When switching the observation method to the RC observation, the objective 14 having a magnification suitable for observing the egg is placed into the observation optical path by the rotation of the revolving nosepiece 21, and the apertured plate 7 is placed on the illumination optical path by the rotation of the condenser turret 5. Furthermore, the DIC prism 17 is removed from the observation optical path and placed outside the observation optical path. Accordingly, the observation method of the microscope 1 may be switched to the RC observation. Meanwhile, the DIC prism 17 may be placed on the observation optical path in the case of the RC observation.

When switching the observation method to the DIC observation, the objective 16 having a magnification suitable for observing the sperm is placed in the observation optical path with the rotation of the revolving nosepiece 21, and the DIC prism 10 is placed in the illumination optical path with the rotation of the condenser turret 5. Furthermore, the DIC prism 17 forming a pair with the DIC prism 10 is inserted into the observation optical path. Accordingly, the observation method of the microscope 1 may be switched to the DIC observation.

When switching the observation method to the PO observation, the objective 14 having a magnification suitable for observing the egg is placed in the observation optical path with the rotation of the revolving nosepiece 21, the compensator 4 is placed in the illumination optical path by the rotation of the condenser turret 5. Furthermore, the DIC prism 17 is removed from the observation optical path and placed outside the observation optical path. Accordingly, the observation method of the microscope 1 may be switched to the PO observation.

While these operations may be performed manually, in the microscope 1 according to the present embodiment, they are performed in an electrically-driven manner under the control by the drive control unit 19. Specifically, with the user specifying the observation method via an input unit that is not illustrated in the drawing, the drive control unit 19 reads out the setting of the microscope 1 corresponding to the specified observation method from the memory 20, and according to the setting, controls the rotation of the condenser turret 5, the rotation of the revolving nosepiece 21, and the insertion/removal of the DIC prism 17. Accordingly, the observation method is switched in an electrically-driven manner.

Furthermore, the setting of the microscope 1 stored in the memory 20 includes the setting for adjusting the contrast of the image of the sample 13 for each observation method. Specifically, in the RC observation, the contrast of image of the sample 13 is adjusted by the rotation of the polarization plate 3, so the setting of the microscope corresponding to the RC observation includes the setting regarding the rotation of the polarization plate 3. In the DIC observation, the contrast of the image of the sample 13 is adjusted by the movement of the DIC prism 17, so the setting of the microscope 1 corresponding to the DIC observation includes the setting regarding the movement of the DIC prism 17 in the plane orthogonal to the optical axis. In the PO observation, the contrast of the image of the sample 13 is adjusted by the change of the retardation of the compensator 4, so the setting of the microscope 1 corresponding to the PO observation includes the setting regarding the change of the retardation of the compensator 4.

While it is not illustrated in the drawing, a retardation adjustment input unit such as a computer may be connected to the drive control unit 19. By the input from the retardation adjustment input unit, in each of the RC observation, DIC observation and PO observation, adjustment may be made to a value of the contrast that the user desires.

The setting regarding the change of the retardation of the compensator 4 is, more specifically, the setting regarding the control of the liquid crystal molecules when the compensator 4 is a liquid crystal modulation element, the setting regarding the rotation of the prism in the compensator 4 when the compensator 4 is a Brace-Kohler compensator, and the setting regarding the rotation of the polarization plate 3 with regard to the wavelength plate in the compensator 4 when the compensator 4 is a Senarmont compensator.

By these settings, the contrast of the observed image is adjusted in a good condition at the same time with the switching of the observation method. Meanwhile, the adjustment of the contrast by the drive control unit 19 may be set so that the best contrast may be obtained for each observation method. Meanwhile, the setting may also be made so that, regardless of the observation method, the same contrast as in the state of the last observation may be obtained.

According to the microscope 1 according to the present embodiment, a plurality of observation methods used in microinsemination may be switched in a short period of time with a small number of operations of the rotation of the condenser turret and the insertion/removal of the DIC prism. In addition, since these operations are performed in an electrically-driven manner under the control by the drive control unit 19, the plurality of observation methods can be switched in shorter period of time. In addition, since the settings of contrast according to the observation method also are performed in an electrically-driven manner under the control by the drive control unit 19, the setting operation by the user performed for each observation method may be omitted. Accordingly, with the microscope 1, the time required before starting the operation of microinsemination may be shortened, and it is preferable for microinsemination.

While the modulator 15 is not required for the PO observation, since the existence of the modulator 15 does not affect the PO observation, as described above, the objective 14 having the modulator 15 may be used when performing the PO observation in a similar manner as when performing the RC observation. In addition, in the microscope 1, the DIC prism 17 is placed outside the observation optical path for both the RC observation and the PO observation. Therefore, in the microscope 1 according to the present embodiment, the RC observation and the PO observation may be switched by the rotation of the condenser turret 5 only, making it possible to switch the observation method in a shorter period of time.

Embodiment 2

FIG. 5 is a diagram for illustrating the configuration of the microscope according to the present embodiment. First, the configuration of a microscope 22 according to the present embodiment illustrated in FIG. 5 is explained. Among the constituent elements in FIG. 5, the same numerals are assigned to the same constituent elements as in FIG. 1, and explanation for them is omitted.

The microscope 22 illustrated in FIG. 5 is an inverted microscope that is capable performing the RC observation, DIC observation, PO observation selectively while switching between them as needed, which is a microscope preferable for microinsemination.

The configuration of the microscope 22 differs from the configuration of the microscope 1 according to embodiment 1 in that the compensator 4 is placed between the condenser turret 5 and the polarization plate 3, and an apertured plate 11 on which an aperture 12 is formed is included in the condenser turret instead of the compensator 4. The other configurations of the microscope 22 are similar to the microscope 1.

The condenser turret 5 includes an apertured plate 7 (a first apertured plate) having a polarization plate 9 in a part of an aperture 8 being an optical element for the RC observation, a DIC prism 10 (a first DIC prism) being an optical element for the DIC observation, and the apertured plate 11 on which the aperture 12 is formed being an optical element for the PO observation inside. The optical element placed on the optical path in the condenser turret 5 is switched by the rotation of the condenser turret 5 according to the observation method. Specifically, the apertured plate 7 having the polarization plate 9 is placed on the optical path when performing the RC observation, the DIC prism 10 is placed on the optical path when performing the DIC observation, and the apertured plate 11 on which the aperture 12 is formed is placed on the optical path when performing the PO observation.

The aperture 12 formed on the apertured plate 11 is formed to have a sufficient size so as not to block the illumination light. Therefore, the aperture 12 of the apertured plate 11 enables illumination with a high numerical aperture when placed in the illumination light path by the rotation of the condenser turret 5. In addition, the apertured plate 11 may be a part of the condenser turret 5, and in that case, the aperture 12 may be formed on the condenser turret 5 itself.

In the microscope 22 according to the present embodiment, in a similar manner as in the microscope 1 according to embodiment 1, the RC observation and the PO observation and the DIC observation may be switched arbitrarily by the switching operation of the optical element to be placed on the optical path with the rotation of the condenser turret 5, the switching operation of the objectives with the rotation of the revolving nosepiece 21, and the insertion/removal operation of the DIC prism 17.

The microscope 22 according to the present embodiment is similar to the microscope 1 according to embodiment 1 also in that these operations are performed in an electrically-driven manner under the control by the drive control unit 19. Specifically, with the user specifying the observation method via an input unit that is not illustrated in the drawing, the drive control unit 19 reads out the setting of the microscope 1 corresponding to the specified observation method from the memory 20, and according to the setting, controls the rotation of the condenser turret 5, the rotation of the revolving nosepiece 21, and the insertion/removal of the DIC prism 17.

Accordingly, the observation method is switched in an electrically-driven manner. Meanwhile, in the microscope 22, in a similar manner as in the microscope 1 according to embodiment 1, the switching operation may be performed manually.

Next, the contrast adjusting method in the microscope 22 according to the present embodiment is explained. The microscope 22 according to the present embodiment differs from the microscope 1 according to the embodiment 1 in that the contrast of the image of the sample 13 may be adjusted by changing the retardation of the compensator 4 regardless of the observation method.

In the RC observation, due to the retardation of the compensator 4, the linearly-polarized light through the polarization plate 3 changes to an elliptically-polarized light. The state of the ellipse changes according to the magnitude of the retardation of the compensator 4. Therefore, the amount of light of the illumination light through the polarization plate 9 fixed in a certain direction with respect to the polarization plate 3 changes with the change of the retardation of the compensator 4, and as a result, the contrast of the image of the sample 13 may be adjusted.

The DIC observation visualizes, by the action of interference, the phase difference generated by two polarized lights that are orthogonal to each other separated by the DIC prism 10 and synthesized by the DIC prism 17 passing through slightly different positions of the sample 13. In the DIC observation, by generating a phase difference by the retardation of the compensator 4 in advance before falling on the DIC prism 10, the phase difference between the two polarized lights generated eventually also changes. Therefore, the contrast of the image of the sample 13 may be changed by changing the retardation of the compensator 4.

In the PO observation, conventionally, the contrast of the image of the sample is adjusted by changing the retardation of the compensator. While the compensator 4 of the microscope 22 is placed in the illumination optical path unlike the compensator 58 of the microscope 50 according to the conventional art illustrated in FIG. 4, it operates in a similar manner as the compensator 58 that is placed in the observation optical path. Therefore, the contrast of the image of the sample 13 may be adjusted by changing the retardation of the compensator 4.

Thus, in the microscope 22 according to the present embodiment, the operation unit for adjusting the contrast is integrated as the compensator 4 regardless of the observation method. Therefore, the operation method is integrated, and the microscope 22 has a high operability. The operation of the microinsemination needs to be performed with an extreme precision and care, and in order to perform such an operation quickly in a short period of time, the operability of the microscope is very important. Therefore, the microscope 22 that is capable of adjusting the contrast by the compensator 4 regardless of the observation method is preferable for microinsemination.

By contrast, when using the microscope according to the conventional art illustrated in FIG. 2 thorough FIG. 4 or and the microscope 1 according to embodiment 1, the operation unit for adjusting the contrast is respectively different for the RC observation, DIC observation and the PO observation, and their operation methods are not integrated. Specifically, in the RC observation, the contrast is adjusted by rotating the polarizer provided on the light source side of the condenser lens. In the DIC observation, the contrast is adjusted by moving the DIC prism in the direction that is perpendicular to the optical axis. In addition, in the PO observation, the contrast is adjusted by changing the retardation of the compensator provided between the polarizer and the analyzer.

Thus, according to the microscope 22 according to the present embodiment, a similar effect as in the microscope 1 according to the embodiment 1 may be obtained. That is, a plurality of observation methods used for microinsemination may be switched in a short period of time with a small number of operations of the rotation of the condenser turret 5 and the insertion/removal of the DIC prism 17, in addition to the rotation of the revolving nosepiece 21. In addition, since these operations are performed in an electrically-driven manner under the control by the drive control unit 19, a plurality of observation methods may be switched in a shorter period of time. Furthermore, since the setting of the contrast according to the observation method is also performed in an electrically-driven manner under the control by the drive control unit 19, the setting operation performed by the user for each observation method may be omitted. Accordingly, with the microscope 22, the time required before starting the operation of microinsemination may be shortened, which is preferable for microinsemination.

In addition, according to the microscope 22 according to the present embodiment, the contrast may be adjusted by the compensator 4 regardless of the observation method. Therefore, the load on the user required for the adjusting operation of the contrast may be reduced by the high operability. Therefore, the manual adjustment of the contrast may be performed easily with the microscope 22.

Meanwhile, in a similar manner as the microscope 1 according to the embodiment 1, the contrast may be adjusted by the polarization plate 3 in the RC observation also in the microscope 22. In addition, in the DIC observation, the contrast may also be adjusted by moving the DIC prism 17 in the direction that is perpendicular to the optical axis.

The present embodiment presents an example in which the compensator 4 is placed between the polarizer (the polarization plate 3) and the condenser turret 5. The compensator 4 may be placed between the objective 14 and analyzer (the polarization plate 18).

Embodiment 3

Figure 6:
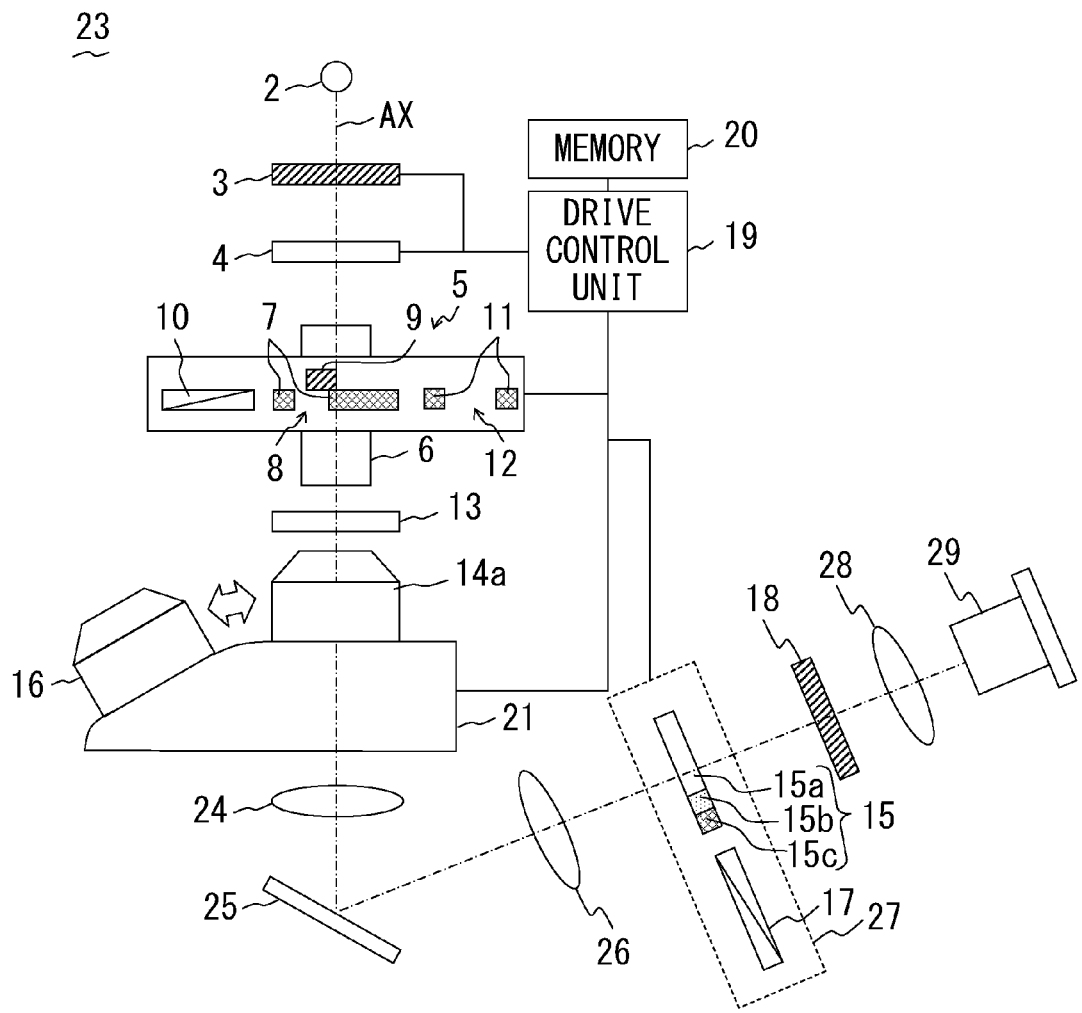
FIG. 6 is a diagram for explaining the configuration of a microscope according to embodiment 3.

FIG. 6 is a diagram for illustrating the configuration of the microscope according to the present embodiment. Hereinafter, the configuration of a microscope 23 according to the present embodiment illustrated in FIG. 6 is explained. Among the constituent elements in FIG. 6, the same numerals are assigned to the same constituent elements as in FIG. 1 or FIG. 5 and explanation for them is omitted. In addition, the contrast adjusting method for the microscope 23 according to the present embodiment is similar to the contrast adjusting method for the microscope 22 according to embodiment 2 illustrated in FIG. 5.

The microscope 23 illustrated in FIG. 6 is an inverted microscope that is capable of performing the RC observation, DIC observation, PO observation selectively while switching between them as needed, which is a microscope preferable for microinsemination.

The configuration on the light source side of the microscope 23 with respect to the sample 13 is similar to the microscope 22 according to embodiment 2 illustrated in FIG. 5, while the configuration of the image side of the microscope 23 with respect to the sample 13 is different from the microscope 22 according to embodiment 2. In addition, the microscope 23 is similar to the microscope 22 according to embodiment 2 in that it includes the drive control unit 19 and the memory 20, but differs from the microscope 22 according to embodiment 2 in that the drive control unit 19 is connected to a switching unit 27 described later instead of the DIC prism 17.

The microscope 23 includes an objective 14a that faces the condenser lens 6 across the sample 13, the revolving nosepiece 21 on which the objective 14a and the objective 16 are installed, a tube lens 24, a mirror 25, a relay lens 26, the switching unit 27, the polarization plate 18 (a second polarization plate) that functions as an analyzer, a relay lens 28 and an eyepiece 29, in this order from the sample side, on the observation optical path.

The objective 14a is an objective with no modulator and having a magnification (for example, 20×) suitable for observing the egg. The objective 14a is used in the RC observation and the PO observation to observe the egg, and the objective 16 is used in the DIC observation to observe the sperm.

The switching unit 27 is means to switch and insert the modulator 15 and the DIC prism 17 (a second DIC prism) to the observation optical path. Specifically, the switching is performed so that the modulator 15 is placed in the optical path when performing the RC observation, the DIC prism 17 is placed in the optical path when performing the DIC observation, and no optical element is placed on the optical path when performing the PO observation. The modulator 15 placed on the observation optical path by the switching unit 27 is placed on a position that is optically conjugate with the pupil position of the objective 14a.

The tube lens 24 focuses the light output from the objective (the objective 14a or the objective 16) to form an intermediate image. The relay lens 26 converts the divergent light from the position formed the intermediate image into an approximately parallel light. Accordingly, the approximately parallel light falls on the DIC prism 17 and the polarization plate 18. In addition, when the objective 14a is placed on the optical path, the relay 26 relays the pupil of the objective 14a to the position on which the modulator 15 is placed. Accordingly, a conjugate relationship between the apertured plate 7 placed on the pupil position of the condenser lens 6 and the modulator 15 placed on the pupil conjugate position of the objective 14a is formed.

In the microscope 23 according to the present embodiment, the RC observation and the PO observation and the DIC observation may be switched arbitrarily by the switching operation of the optical element to be placed on the optical path with the rotation of the condenser turret 5, the switching operation of the objectives with the rotation of the revolving nosepiece 21, and the switching operation with the switching unit 27.

While these operations may be performed manually, in the microscope 23, they are performed in an electrically-driven manner under the control by the drive control unit 19. Specifically, with the user specifying the observation method via an input unit that is not illustrated in the drawing, the drive unit 19 reads out the setting of the microscope 23 corresponding to the specified observation method from the memory 20, and according to the setting, controls the rotation of the condenser turret 5, the rotation of the revolving nosepiece 21 and the switching by the switching unit 27. Accordingly, the observation method is switched in an electrically-driven manner.

Thus, in the microscope 23 according to the present embodiment, a similar effect as in the microscope 22 according to the embodiment 2 may be obtained. That is, a plurality of observation methods used for microinsemination may be switched in a short period of time with a small number of operations of the rotation of the condenser turret 5 and the switching operation by the switching unit 27, in addition to the rotation of the revolving nosepiece 21. In addition, since these operations are performed in an electrically-driven manner under the control by the drive control unit 19, a plurality of observation methods may be switched in a shorter period of time. Furthermore, since the setting of the contrast according to the observation method is also performed electrically under the control by the drive control unit 19, the setting operation performed by the user for each observation method may be omitted. Accordingly, with the microscope 23, the time required before starting the operation of microinsemination may be shortened, and is preferable for microinsemination. In addition, according to the microscope 23 according to the present embodiment, the contrast may be adjusted by the compensator 4 regardless of the observation method. Therefore, the load on the user required for the adjusting operation of the contrast may be reduced by the high operability.

Furthermore, in the microscope 23 according to the present embodiment, since the modulator 15 is placed on a pupil conjugate position, there is no need to prepare an objective with a modulator dedicated for the RC observation.

While the compensator 4 is placed between the polarization plate 3 and the condenser turret 5 in FIG. 5, the placement of the compensator 4 is not limited to the position between the polarization plate 3 and the condenser turret 5. In a similar manner as in the microscope 1 according to embodiment 1, the compensator 4 may be placed inside the condenser turret 5.

Meanwhile, for the switching of the observation methods, another effective method is to switch the observation method in conjunction with the detection by an attached sensor that detects which aperture (optical element) is in a predetermined position of the condenser turret. That is, the observation method may be switched by detecting whether the position (a predetermined position) of the condenser turret changed manually is the position of the DIC prism, the position of the optical element for modulation contrast or the position of the compensator or the apertured plate, and by operating at least one of the revolving nosepiece, DIC slider or the polarizer (polarization plate) to perform the observation according to the detection result (DIC observation, RC observation or PO observation). While described above is an example of linking the revolving nosepiece and the DIC slider and the polarizer when rotating the condenser turret manually, another effective method is to switch the observation method in a similar manner in conjunction with the detection by an sensor attached to the revolving nosepiece that detects which objective is in the optical path. That is, when the revolving nosepiece with the attached sensor is rotated manually and the objective according to the observation method enters the optical path, the condenser turret and the DIC slider and the polarizer operate to switch the observation method.

Embodiment 4

Figure 8:
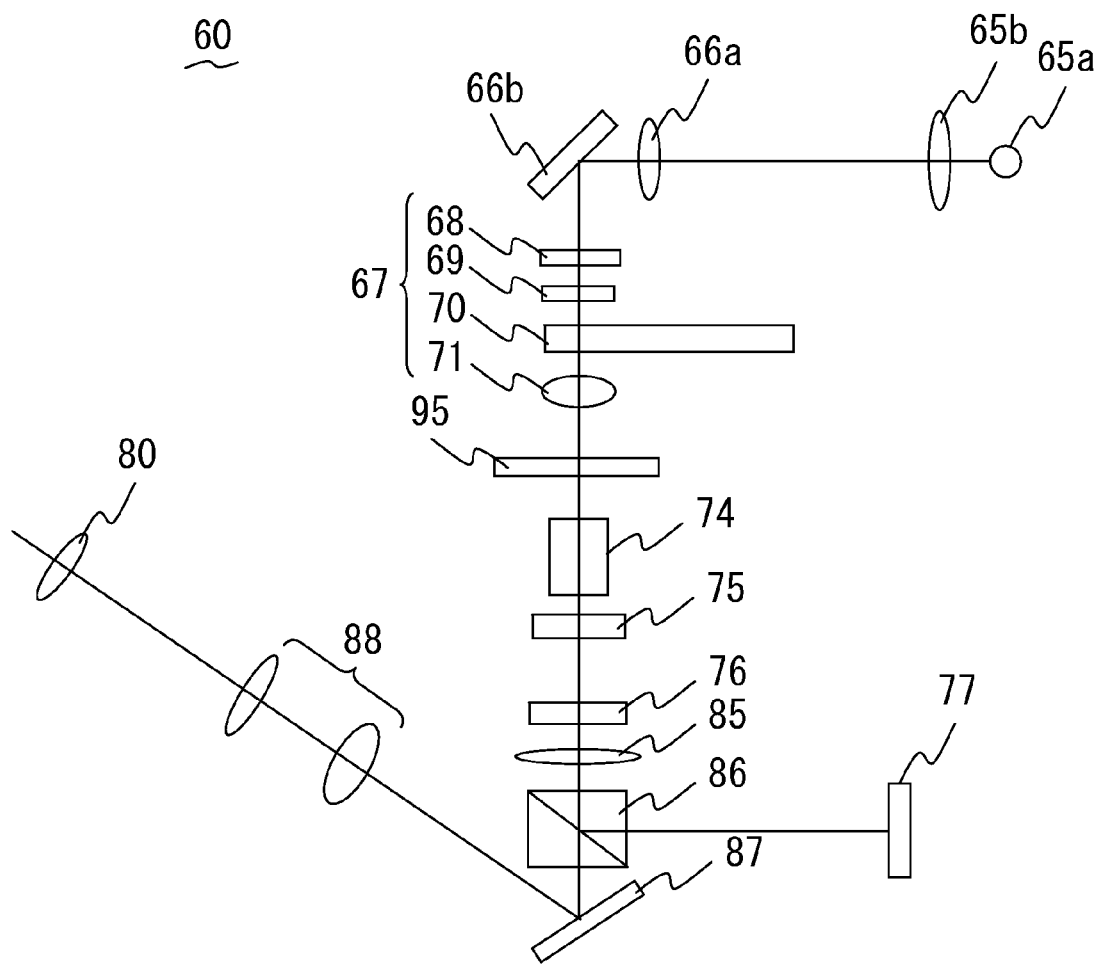
FIG. 8 is a diagram for explaining the layout of optical elements included in the microscope according to embodiment 4.

FIG. 7 is a diagram for explaining the configuration of a microscope according to the present embodiment. FIG. 8 is a diagram for explaining the layout of the optical elements included in the microscope according to the present embodiment. FIG. 9 is a diagram for explaining the configuration of the condenser turret of the microscope according to the present embodiment.

A microscope 60 illustrated in FIG. 7 and FIG. 8 is a microscope that is capable of performing the RC observation, PO observation, DIC observation, bright field observation, and has a configuration in which fast switching of the RC observation and the PO observation is available. In microinsemination, the insemination is performed under the microscope by taking out an egg that has been cultivated to the optimal state in an incubator, but being under the microscope is not an optimal environment (the temperature, humidity, $CO_2$ concentration and the like) for an egg. Therefore, since putting the egg under the microscope for a long time gives stresses to the egg, fast switching of the observation methods to perform the operation of the microinsemination in a short time for prompt return to the incubator lead to an improvement in the success fate of the microinsemination. For this reason, the microscope 60 according to the present embodiment in which fast switching of observation methods is available is an optimal microscope for microinsemination.

The microscope 60 includes, as illustrated in FIG. 7, a microscope main body 61 for observing a sample 95 stored in a Petri dish placed on a stage 72, a hand switch unit 62 into which an instruction of the change of the observation method and the like is input, a control box 63 composed of a personal computer and the like and functions as a control unit to perform the operation control of the microscope 60 and image processing, and a monitor 64 that displays the image of the sample 95 obtained in the microscope 60, being a microscope used for microinsemination under the microscope in which the Petri dish is placed on the stage 72.

In a Petri dish used for microinsemination, generally, a plurality of drops of culture solution is created, and these drops include a drop including a sperm and a drop including an egg. There is also a case in which a separate drop for insemination is created. The drop is often covered by mineral oil to avoid bacterial infection and drying due to exposure to the air. Meanwhile, in the microscope 60, a glass bottom dish in which the bottom surface of the Petri dish is not plastic but glass is used. This is because a plastic Petri dish has a strong birefringence and makes the PO observation and DIC observation difficult.

The microscope main body 61 includes, as illustrated in FIG. 7, a lamp house 65, an illumination pillar 66, and a condenser unit 67. In the microscope main body 61, the light from the lamp house 65 illuminates the sample 95 in the Petri dish placed on the stage 72, through the illumination pillar 66 and the condenser unit 67. Meanwhile, the part of the stage 72 on which the Petri dish is placed is a heat stage 72a, and the Petri dish is heated to 37 degrees Celsius by the heat stage 72a.

The condenser unit 67 is composed of, as illustrated in FIG. 8, a polarizer 68, a compensator 69, a condenser turret 70, a condenser lens 71 placed in this order from the light source 65a side. Inside the condenser turret 70, as illustrated in FIG. 9, an aperture 81 constituting an apertured plate with the condenser turret 70 main body, a DIC prism 82, two types of apertured plates for relief observation (an apertured plate for relief observation 83, an apertured plate for relief observation 84) are placed.

The polarizer 68 is a first polarization plate used in combination with an analyzer 76 described later, and is placed rotatably around the optical axis. The polarizer 68 is configured so as to rotate in an electrically-driven manner under the control of the control box 63 according to the observation method, and rotates so as to be in the parallel-Nicol condition with the analyzer 76 in the bright field observation, and so as to be in the crossed-Nicol condition with the analyzer 76 in the PO observation and DIC observation. In addition, in the RC observation, it rotates to a given rotation angle for the adjustment of the contrast.

The compensator 69 has a structure to vary the retardation and is configured to change the retardation in an electrically-driven manner under the control of the control box 63. By the change of the retardation of the compensator 69, the contrast in the PO observation may be adjusted. Meanwhile, in the microscope 60, the compensator 69 is placed between the condenser turret 70 and the polarizer 68 to constitute the condenser unit 67, but the compensator 69 may also be arranged between an objective 74 and the analyzer 76 illustrated in FIG. 8, as long as it is arranged between the polarizer 68 and the analyzer 76.

Inside the condenser turret 70, as illustrated in FIG. 9, a plurality of optical elements that are switched and used according to the observation method and magnification is arranged. The condenser turret 70 is configured to rotate in an electrically-driven manner under the control of the control box 63 according to the observation method, so that one of the optical elements is positioned on the optical axis.

The aperture 81 constitutes the apertured plate with the condenser turret 70, and is used for the bright field observation and PO observation. That is, the condenser turret 70 includes an apertured plate for the bright field observation or PO observation. In the bright field observation, for the preparation of microinsemination, a position search in the Petri dish and positioning of the needle tip of the micro pipette manipulated by the manipulator and the like are performed by using 4× and 10× objective.

The DIC prism 82 is a first DIC prism used for the 60×DIC observation, and with a second DIC prism paced on the image side on the objective described later, constitutes a differential interference contrast optical system.

The apertured plates for relief observation (apertured plate for relief observation 83, apertured plate for relief observation 84) are apertured plates used for the RC observation, on which a part of the aperture formed on an eccentric position from the optical axis is covered by the polarization plate. The apertured plate for relief observation 83, and the apertured plate for relief observation 84 are respectively the apertured plate used for the 20×RC observation, 40×RC observation, respectively, and the positions and the sizes of the apertures are different.

Meanwhile, the condenser turret 70 is, as illustrated in FIG. 9, a 4-hole turret formed four holes. Since the larger the number of holes, the larger the turret generally, a turret with an excessively large number of holes is not preferable as it may interfere with the manipulator that is not illustrated in the drawing and that manipulates in three dimensions a micro pipette and a holding pipette used for injecting a sperm into an egg.

The microscope main body 61 includes, further, as illustrated in FIG. 7, a revolving nosepiece 73 on which a plurality of objectives is mounted, a DIC prism 75, an analyzer 76, an imaging device 77, a handle unit 78 to raise and lower the revolving nosepiece 73, and a lens tube 79 to which an eyepiece 80 is attached.

When performing microinsemination, it is necessary to observe the egg and the sperm, and the magnification of the objective used for the observation is different for the observation of the egg and for the observation of the sperm. Specifically, when observing the egg, the objective of 20× or 40× is desirable, and when observing the sperm that is smaller than the egg, the objective of 60× or 100× is desirable. Therefore, it is desirable that the revolving nosepiece 73 is configured so as to switch the objective in an electrically-driven manner under the control of the control box 63.

A plurality of objectives 74 mounted on the revolving nosepiece 73 includes a 20× objective and a 40× objective for the RC observation used for the observation of the egg by the RC observation and a 60× objective used for the observation of the sperm by the DIC observation, and a 4× objective used for the bright field observation. In addition, a 100× objective and the like used for the observation of the sperm by the DIC observation may also be included. The 20× objective for the RC observation is also used for the observation of the egg by the PO observation. Since it is desirable that the PO observation is conducted at the same magnification as the magnification of the RC observation, the 40× objective for the RC observation may further be used for the observation of the egg by the PO observation. Meanwhile, all the objectives are objectives of the infinity-corrected type.

The objective for the RC observation is an objective including a modulator such as the one described in Embodiment 1 and Embodiment 2. It is desirable that the objective for the RC observation is composed of a lens with less distortion. While the influence of the distortion of the lens is small in the normal RC observation, since the PO observation is performed with the objective for the RC observation in the microscope 60, it is necessary to keep down the distortion of the lens. Considering that the retardation of the spindle of the egg observed in the PO observation is about 5 nm, for a good PO observation of the spindle, it is desirable that the retardation of the objective for the RC observation is 2 nm or less. Meanwhile, for the same reason, it is desirable that the condenser lens 71 is also composed of a lens with less distortion, and it is desirable that the retardation of the condenser lens 71 is 2 nm or less.

The DIC prism 75 is the second DIC prism that forms a pair with the DIC prism 82 being the first prism, and is placed detachably with respective to the optical path inside the revolving nosepiece 73, that is, between the objective 74 and the analyzer 76. The DIC prism 75 is needed for the DIC observation but is not needed for other observation methods. Therefore, with the observations (RC observation, PO observation, bright field observation) other than the DIC observation, it is removed from the optical path. Meanwhile, the contrast in the PO observation may be adjusted by moving the DIC prism 75 in the horizontal direction, that is, in the direction that is orthogonal to the optical axis. For this reason, the DIC prism 75 is configured to be slid by a moving mechanism that is not illustrated in the drawing. The insertion/detachment and movement of the DIC prism 75 is performed in an electrically-driven manner under the control of the control box 63. Meanwhile, the adjustment of the contrast in the DIC observation may also be performed by changing the retardation of the compensator 69.

The analyzer 76 is a second polarized plate used in combination with the polarizer 68. The analyzer 76 is not needed for the RC observation, but the presence only makes the image slightly darker and does not affect how the appearance of the image itself. For this reason, the analyzer 76 is fixed on the optical path. Meanwhile, it is desirable, as illustrated in FIG. 8, that the analyzer 76 is placed on the image side with respect to the objective 74, more specifically, between the objective 74 to which the parallel light flux enters and a tube lens 85. When placed at this position, even if the analyzer 76 is inserted to/removed from the optical path, the image position does not move. Therefore, the analyzer 76 may be removed from the optical path at the time of the RC observation.

As illustrated in FIG. 8, the imaging device 77 detects one of lights divided by an optical path dividing prism 86 and converts it into an electric signal, and the electric signal is transmitted to the control box 63 and displayed on the monitor. The monitor image is recorded by a video recording device and the like as needed. Meanwhile, the other of the lights divided by the optical path dividing prism 86 enters the eyepiece 80.

The optical path dividing prism 86 illustrated in FIG. 8 is a prism in which coating for dividing the optical path is applied on the joint surface, and is an optical path dividing unit that divides the light from the sample 95 and guides it to the optical path for visual observation and the optical path for image capturing. While the works are done visually in microinsemination in general, at the same time with the visual observation, video recording of moving pictures, capturing of still images are performed in many cases. By guiding the light to both the visual side and the image capturing side by the optical path dividing unit, it becomes possible to shorten the time as there is no need to switch the optical path.

In the microscope 60 configured as described above, as illustrated in FIG. 8, the light from the light source 65a enters the polarizer 68 and polarizes, via a collector lens 65b, an illumination lens 66a, and a mirror 66b. The polarized light from the polarizer 68 passes through the optical element in the condenser turret 70 via a compensator 69, and is cast on the sample 95 by the condenser lens 71. The light from the sample 95 is converted into a parallel light flux in the objective 74 and enters the optical path dividing prism 86 via the DIC prism 75, the analyzer 76, and the tube lens 85. At this time, the image of the sample 95 is projected while being magnified by the objective 74 and the tube lens 85. One of the lights divided by the optical path dividing prism 86 enters the imaging device 77, and the other enters the human eye, via the mirror 87, the relay lens 88 and the eyepiece 80. Accordingly, the visual observation and image capturing may be performed at the same time.

Meanwhile, when the microscope 60 is used for microinsemination, it is preferable that the optical path dividing prism 86 satisfies the following conditional expression, assuming the total amount of light that enters the optical path dividing prism 86 as L1 and the amount of light guided to the optical path for visual observation as L2.

$$20 < L2/L1 < 60$$

Falling below the lower end of the conditional expression above, the amount of light guided to the optical path for visual observation is insufficient and the efficiency of the microinsemination decreases. Especially, in the microscope 60 in which the analyzer 76 is fixed on the optical path, it needs to be taken into consideration that the amount of light in the RC observation decreases due to the presence of the analyzer 76. On the other hand, exceeding the upper end of the conditional expression above, a sufficient amount of light is guided to the optical path for visual observation, but the amount of light guided to the path for image capturing is insufficient, and as a result, the noise increases. In microinsemination, there are many cases in which while microinsemination works are done with visual observation, image capturing of the overall works and the state of the egg is performed using an imaging device, and by satisfying the conditional expression above, it becomes possible to perform the visual observation and image capturing at the same time while maintaining workability. In the microscope 60, the optical path dividing prism 86 is configured so as to guide the light at 50:50 to the optical path for visual observation and the optical path for image capturing.

Figure 10:
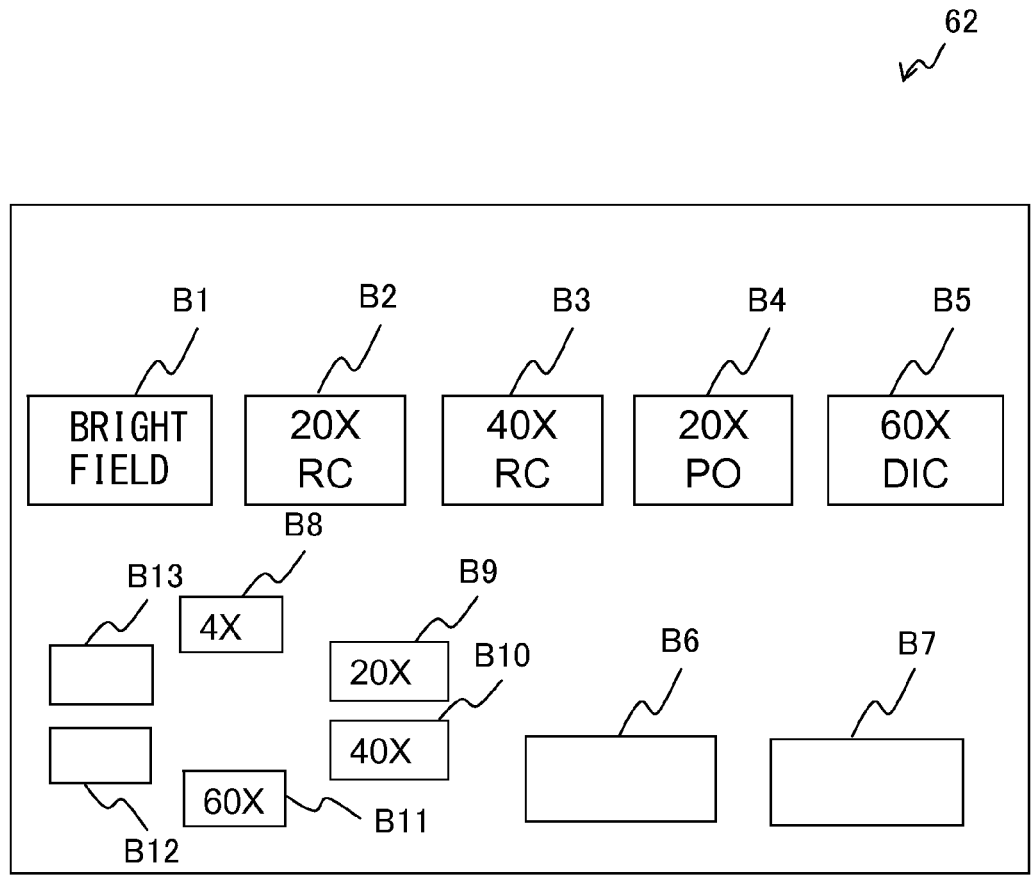
FIG. 10 is a diagram for explaining the configuration of a hand switch unit of the microscope according to embodiment 4.

Next, referring to FIG. 10 and FIG. 11, switching of the observation methods is explained. FIG. 10 is a diagram for explaining the configuration of the hand switch unit of the microscope according to the present embodiment. FIG. 11 is a setting table of the microscope according to the present embodiment.

In the microscope 60, the observation methods may be switched by operating the hand switch unit 62 illustrated in FIG. 10. In addition, adjustment of the contrast in the observation method may also be performed by operating the hand switch unit 62.

As illustrated in FIG. 10, the hand switch unit 62 includes a button group (buttons B1 through B5) corresponding to the observation methods, a contrast adjustment button group (buttons B6, B7), and a revolving nosepiece driving button group (buttons B8 through B13).

When switching the observation method of the microscope 60 to the bright field observation, the button B1 of the hand switch unit 62 is pressed. The control box 63 that has detected the pressing of the button rotates the polarizer 68 to let the polarizer 68 and the analyzer 76 be in the parallel-Nicol condition, and rotates the condenser turret 70 and the revolving nosepiece 73 to insert the aperture 81 and the 4× objective on the optical path. Since the parallel-Nicol condition uses two polarization plates, it is not a strict bright field observation, but there is no problem in location search for the sample. Furthermore, when the DIC prism 75 is inserted into the optical path, the DIC prism 75 is removed to the outside of the optical path. Accordingly, the observation method of the microscope 60 is switched to the bright field observation of the 4× observation magnification. When the 10× objective is mounted on the revolving nosepiece 73, the 10× objective may also be inserted on the optical path. Meanwhile, the bright field observation is selected in a case when a work to align the needle tip of the micropipette, that is, a work to determine the position of the needle tip is performed, and the like.

When switching the observation method of the microscope 60 to the RC observation of the 20× observation magnification, the button B2 of the hand switch unit 62 is pressed. The control box 63 that has detected the pressing of the button reads out the setting of the polarizer 68 that used in the last RC observation and that stored in the storing unit of the control box 63 (specifically, the rotation angle). Then, according to the read-out setting of the RC observation, the rotation angle of the polarizer 68 is changed. Furthermore, the condenser turret 70 and the revolving nosepiece 73 are rotated, to insert the aperture plate 83 for the RC observation and the 20× objective for the RC observation. Furthermore, when the DIC prism 75 is inserted into the optical path, the DIC prism 75 is removed to the outside of the optical path. Accordingly, the observation method of the microscope 60 is switched to the RC observation of the 20× observation magnification. Meanwhile, when switching the observation method of the microscope 60 to the RC observation of the 40× observation magnification, the button B3 of the hand switch unit 62 is pressed. The control box 63 that has detected the pressing of the button operates in the same manner as when the button B2 is pressed, except for inserting the 40× objective for the RC observation into the optical path instead of the 20× objective for the RC observation, and the observation method of the microscope 60 is switched to the RC observation of the 40× observation magnification. Meanwhile, the RC observation is selected when observing the exterior appearance of the egg.

When adjusting the contrast in the RC observation, the button B6 or the button B7 may be pressed. When the button B6 is pressed, the control box 63 rotates the polarizer 68 clockwise for example to change the rotation angle of the polarizer 68, and when the button B7 is pressed, the control box 63 rotates the polarizer 68 counterclockwise for example to change the rotation angle of the polarizer 68. Accordingly, the contrast may be adjusted.

When switching the observation method of the microscope 60 to the PO observation of the 20× observation magnification, the button B4 of the hand switch unit 62 is pressed. The control box 63 that has detected the pressing of the button rotates the polarizer 68 to let the polarizer 68 and the analyzer 76 be in the crossed-Nicol condition, and rotates the condenser turret 70 and the revolving nosepiece 73 to insert the aperture 81 and the 20× objective for the RC observation into the optical path. Furthermore, when the DIC prism 75 is inserted into the optical path, it is impossible to visualize the subtle birefringence of the sample 95, so the DIC prism 75 is removed to the outside of the optical path. Accordingly, the observation method of the microscope 60 is switched to the PO observation of the 20× observation magnification. Meanwhile, the PO observation is selected when observing the spindle in the egg.

When adjusting the contrast in the PO observation, the button B6 or the button B7 may be pressed as well. When the button B6 is pressed, the control box 63 changes the retardation of the compensator 69 so as to highlight the contrast, and when the button B7 is pressed, the control box 63 changes the retardation of the compensator 69 to lessen the contrast. Accordingly, the contrast may be adjusted. Since the retardation of the compensator 69 changes according to the degree of maturity of the egg, the contrast adjustment function is effective for the observation of the spindle. Meanwhile, it is desirable that the retardation of the compensator 69 soon after switching to the PO observation is set to the retardation of the compensator 69 at the time of the last PO observation. Accordingly, the contrast at the time of the last observation may be reproduced.

In the microscope 60, by using the objective for the RC observation also under the PO observation, switching of the objective is no longer needed between the RC observation and the PO observation both observation being target at the egg. Accordingly, in addition to the shortened time required for the switching of the observation methods, since the deviation of parfocal distances and the deviation of image centers due to the switching of the objective do not occur before and after the switching of the observation methods, the efficiency of the works of microinsemination increases.

When switching the observation method of the microscope 60 to the DIC observation, the button B5 of the hand switch unit 62 is pressed. The control box 63 that has detected the pressing of the button rotates the polarizer 68 to let the polarizer 68 and the analyzer 76 be in the crossed-Nicol condition, and rotates the condenser turret 70 and the revolving nosepiece 73 to insert the DIC prism 82 and the 60× objective into the optical path. Furthermore, when the DIC prism 75 is not inserted into the optical path, the DIC prism 75 is inserted into the optical path. Accordingly, the observation method of the microscope 60 is switched to the DIC observation of the 60× observation magnification. Meanwhile, the DIC observation is selected when observing the sperm. A 100× objective and a DIC prism for the 100× observation magnification may be inserted into the optical path when the sample is observed for the 100× observation magnification.

When adjusting the contrast in the DIC observation, the button B6 or the button B7 may be pressed as well. When the button B6 is pressed, the control box 63 moves the DIC prism 75 in the direction that is orthogonal to the optical axis, and when the button B7 is pressed, the control box 63 moves the DIC prism 75 to the direction that is opposite to the case of the button B6 and that is orthogonal to the optical path. Accordingly, the contrast may be adjusted. Meanwhile, it is desirable that the position of the DIC prism 75 immediately after switching is set to the position at the time of the last DIC observation. Accordingly, the contrast at the time of the last observation may be reproduced. In addition, the adjustment of the contrast in the DIC observation may be performed by changing the retardation of the compensator 69 instead of moving the DIC prism 75.

Figure 12:
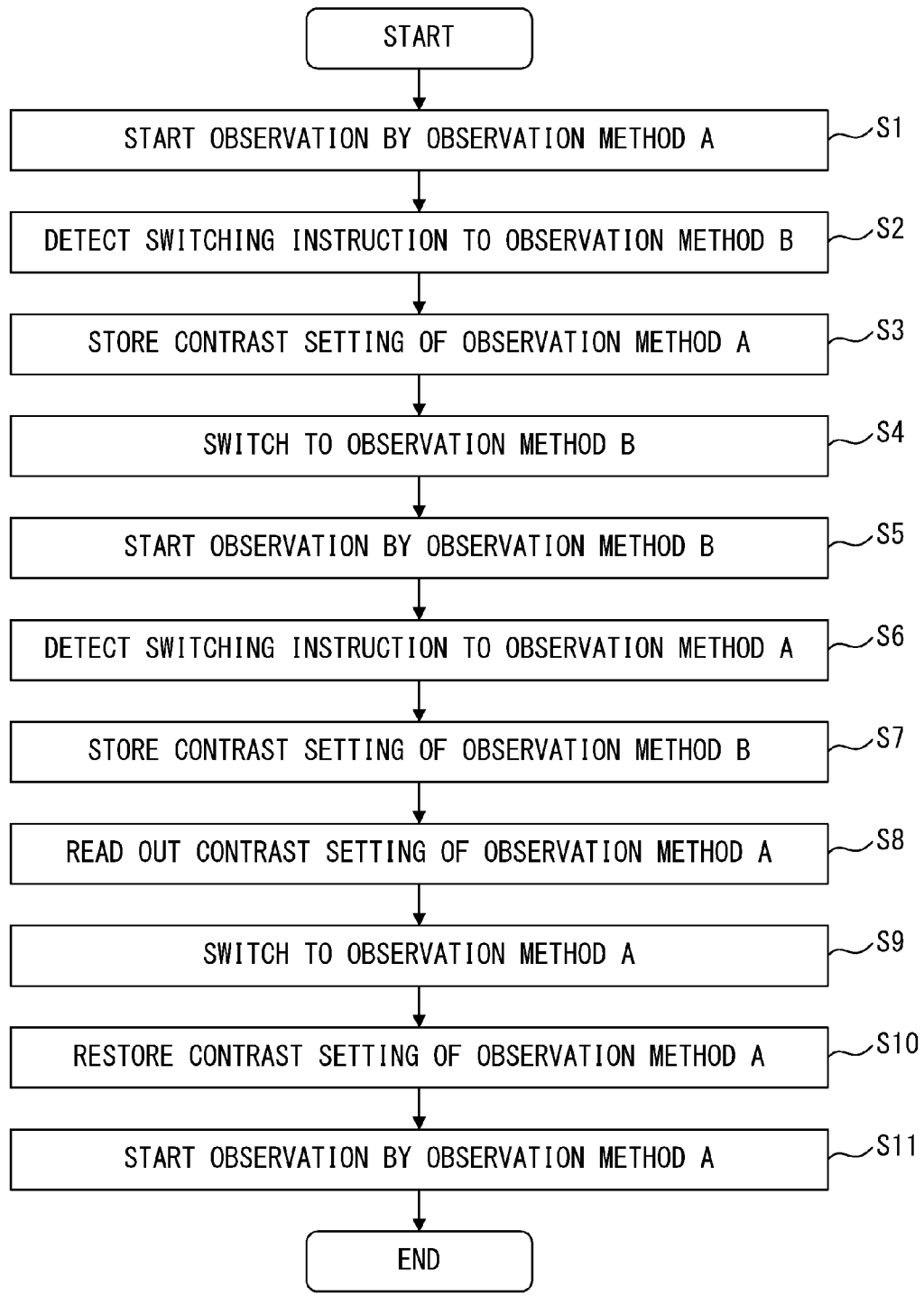
FIG. 12 is a flowchart illustrating a procedure of saving and restoring of the contrast setting of the microscope according to embodiment 4.

FIG. 12 is a flowchart illustrating the procedure to save and restore the contrast setting of the microscope according to the present embodiment. Hereinafter, referring to FIG. 12, the saving and restoring of the contrast setting for each observation method is explained.

First, upon detecting the selection of an observation method A from the hand switch unit 62, the control box 63 switches the observation method of the microscope 60 to the selected observation method A and starts observation by the observation method A (step S1). During the observation by the observation method A, the contrast setting of the observation method A is changed by the operation of the contrast adjustment button group (buttons B7, B8) of the hand switch unit 62 by the user.

Next, when the control box 63 detects an switching instruction to an observation method B from the hand switch unit 62 (step S2), the control box 63 stores the contrast setting of the observation method A being the current observation method in the storing unit of the control box 63 (step S3), and then switches the observation method of the microscope 60 to the observation method B (step S4), and starts observation by the observation method B (step S5). During the observation by the observation method B, the contrast setting of the observation method B is changed by the operation of the contrast adjustment button group (buttons B7, B8) of the hand switch unit 62 by the user.

Further, when the control box 63 detects a switching instruction to the observation method A from the hand switch unit 62 (step S6), the control box 63 stores the contrast setting of the observation method B in the storing unit in the control box 63 (step S7), and then reads out the last contrast setting of the observation method A stored in step S3 from the storing unit (step S8), and switches the observation method of the microscope 60 to the observation method A (step S9). Then, the contrast setting read out in step S8 is restored (step S10), and observation by the observation method A is started (step S11).

As described above, the microscope 60 operates so as to save the setting of the contrast immediately before switching the observation method, and to restore the setting of the contrast of the last time for the observation method immediately after switching the observation method. Accordingly, since the good contrast setting for each observation is reproduced, adjustment of the contrast immediately after switching of the observation methods may be omitted, making it possible to improve the work efficiency.

As explained above, in the microscope 60 according to the present embodiment, the control box 63 functions as a first control unit to rotate the condenser turret 70 in an electrically-driven manner, as a second control unit to change the retardation of the compensator 69 in an electrically-driven manner, and further, as a third control unit to rotate the polarizer 68 in an electrically-driven manner, so that the observation methods are switched just by operating the hand switch unit 62, and adjustment of the contrast according to the observation method is performed at the same time. Therefore, according to the microscope 60 according to the present embodiment, fast switching of the observation methods without any error may be performed, and prompt microinsemination may be realized. In contrast, with the conventional microscope in which switching of optical elements, switching of objectives and contrast adjustment for each observation method in switching the observation methods are performed manually, since there are many cases where setting is done wrongly in switching the observation method, and it takes time for switching and adjustment, it is difficult to perform prompt microinsemination.

Meanwhile, while an example in which the microscope 60 includes an electrically-driven condenser unit (condenser unit 67), an electrically-driven revolving nosepiece (revolving nosepiece 73), electrically-driven DIC prism (DIC prism 75), and the observation methods are switched full-automatically by the hand switch unit 62 is illustrated above, as long as at least a part may be switched in an electrically-driven manner. The condenser unit 67 (the polarizer 68, the compensator 69, the condenser turret 70), the revolving nosepiece 73, and the DIC prism 75 may be switched manually. In addition, for example, only the switching of the objective may be controlled separately in an electrically-driven manner by operating the revolving nosepiece driving button group (buttons B9 through B13) illustrated in FIG. 10.

Next, referring to FIG. 13 and FIG. 14, the procedure of microinsemination using the microscope 60 according to the present embodiment is explained. FIG. 13 is a flowchart illustrating a part of the procedure of microinsemination according to the present embodiment. FIG. 14 is a diagram for explaining image processing by the microscope according to the present embodiment. Meanwhile, FIG. 13 illustrates only the part related to operations for the egg in the procedure of microinsemination.

First, the form of the egg is observed by the RC observation of the observation magnification 20× (step S21). At this time, the contrast setting stored in the storing unit 91 in the control box 63 for each observation method is read out automatically, and the rotation angle of the polarizer 68 is adjusted. Accordingly, observation may be performed on an image for which the contrast setting is adjusted. When an egg 92 matures and becomes suitable for insemination, as illustrated in FIG. 14, a structure called a primary polar body 93 is observed by the RC observation. In step S21, the egg 92 is placed so that the primary polar body 93 is at an upper or lower position in the field of view (image) of the microscope.

The reason for this is as follows. In microinsemination, the needle (micropipette) is stabbed into the egg 92 from the right side of the egg 92 to inject the sperm, and at this time, if a spindle 94 is damaged by the needle, the insemination fails. Therefore, considering that there are many cases where the spindle 94 is close to the primary polar body 93, in step S21, the primary polar body 93 is placed to be at an upper or lower position, so as to move the spindle 94 away from the center part into which the needle is stabbed.

Next, the polarizer 68 and the analyzer 76 are set to the crossed-Nicol condition, and the spindle 94 in the egg is observed by the PO observation of the 20× observation magnification (step S22). While the spindle 94 has retardation of about 5 nm, in the microscope 60, it is possible to observe the spindle 94 visually by adjusting the contrast by the compensator 69. In contrast, conventionally, there has been an apparatus to observe the spindle by performing image processing to a polarization image obtained by the PO observation, but in the conventional apparatus, it is impossible to check of the spindle while performing microinsemination visually.

By checking the presence/absence of the spindle 94 by the PO observation, in the microscope 60, it is possible to judge whether or not the egg 92 has matured to a suitable condition for microinsemination. When the presence of the spindle 94 is not confirmed, a judgment that egg 92 has not matured to a suitable condition for microinsemination. In addition, the position of the spindle 94 may be checked so as not to damage the spindle 94 with the needle. When the spindle 94 is at an inappropriate position, it is moved to a position that does not affect the microinsemination, by operating the holding pipette with the manipulator and rotating the egg. While the position of the spindle is close to the position of the primary polar body in many cases, but this checking operation is required as there are also some cases where the spindle is positioned away from the primary polar body.

Lastly, microinsemination is performed by the RC observation of the 20× observation magnification (step S23). That is, the manipulator is operated to stab, into the egg 92, the micropipette into which the sperm is injected, to guide the sperm into the egg 92. At this time, in the same manner as the step S11, the contrast setting stored for each observation method in the storing unit 91 is read out automatically and the rotation angle of the polarizer 68 is adjusted, making it possible to perform microinsemination under the RC observation in which the contrast is adjusted.

According to the microscope 60, by checking the presence and position of the spindle 94 prospectively using the RC observation and the PO observation as illustrated in FIG. 13, the sperm can be guided into the egg 92 without damaging the spindle 94 in the RC observation, Therefore, since the situation in which the spindle 94 is damaged with the needle may be avoided, it is possible to perform microinsemination at a high success rate.

Meanwhile, as described above, while it is possible to perform sufficient visual check of the presence and position of the spindle 94 in the microscope 60, there are some cases where its figure may not be sufficiently checked by visual check. The figure of the spindle 94 is likely to be related to an abnormality of the egg, and checking the figure of the spindle is likely to be useful for improving the fertility rate. Therefore, to the polarization observation image of the egg output by the driver 89 that has received an electric signal from the image device 77, an image processing unit 90 may apply image processing to further highlight the contrast. The image in which the contrast is highlighted and the figure of the spindle 94 is highlighted may be displayed on the monitor 64 so that it is possible to check the image during microinsemination. The image may be stored in the storing unit 91 composed of a hard disk, an optical disk and the like and may be used later for a study and the like. Accordingly, it becomes possible to check an abnormality in the spindle, and it is likely to be useful for improving the fertility rate.

In addition, while the microscope 60 is illustrated as a microscope in which the bright field observation, RC observation, PO observation, DIC observation may be switched, the microscope 60 may also be configured so that only the RC observation and PO observation may be switched. In this case, the DIC prism 82 in the condenser turret 70 and the DIC prism 73 placed on the objective side may be omitted, making it possible to simplify the configuration of the microscope.

What is claimed is:

1. A microinsemination method using a microscope, the microscope including (i) a light source, (ii) a condenser lens to irradiate a sample with a light from the light source, (iii) an objective facing the condenser lens across the sample, (iv) a first polarization plate placed between the light source and the condenser lens, (v) a condenser turret placed between the first polarization plate and the condenser lens and having a plurality of optical elements placed therein, wherein the condenser turret is configured to switch, by rotation thereof, an optical element to be placed in an optical path from among the plurality of optical elements placed therein, according to an observation method, (vi) a second polarization plate placed such that the objective is located between the condenser lens and the second polarization plate, (vii) and a compensator for changing retardation, wherein the compensator is placed between the first polarization plate and the second polarization plate, the microinsemination method comprising:
    adjusting a rotation angle of the first polarization plate and observing a form of an egg by modulation contrast observation in which a contrast is adjusted;
    setting the first polarization plate and the second polarization plate in a crossed-Nicol condition and observing a spindle of the egg by polarization observation in which a contrast is adjusted by the compensator; and
    adjusting the rotation angle of the first polarization plate and performing microinsemination by modulation contrast observation in which a contrast is adjusted.

2. The microinsemination method according to claim 1, wherein the modulation contrast observation and the polarization observation are performed without switching the objective.

3. The microinsemination method according to claim 1, wherein:
    the plurality of optical elements placed inside the condenser turret comprise:
        an optical element for modulation contrast observation; and
        an apertured plate for polarization observation, and
    a rotation angle of the first polarization plate is changed in an electrically-driven manner.

* * * * *